US012074333B2

(12) United States Patent
Obermann et al.

(10) Patent No.: US 12,074,333 B2
(45) Date of Patent: Aug. 27, 2024

(54) MOTOR CONTROL FOR GAS ENGINE REPLACEMENT DEVICE

(71) Applicant: MILWAUKEE ELECTRIC TOOL CORPORATION, Brookfield, WI (US)

(72) Inventors: Timothy R. Obermann, Waukesha, WI (US); David W. Siegler, New Berlin, WI (US); Alexander Huber, Menomonee Falls, WI (US); William F. Chapman, III, Delevan, WI (US); Patrick D. Gallagher, Oak Creek, WI (US); Timothy J. Bartlett, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 882 days.

(21) Appl. No.: 17/091,908

(22) Filed: Nov. 6, 2020

(65) Prior Publication Data
US 2021/0143375 A1 May 13, 2021

Related U.S. Application Data

(60) Provisional application No. 63/009,642, filed on Apr. 14, 2020, provisional application No. 62/932,711, filed on Nov. 8, 2019.

(51) Int. Cl.
*H02P 21/00* (2016.01)
*H01M 50/20* (2021.01)
*H02P 6/06* (2006.01)

(52) U.S. Cl.
CPC .............. *H01M 50/20* (2021.01); *H02P 6/06* (2013.01)

(58) Field of Classification Search
CPC ............ H02P 6/06; H02P 6/085; H02P 21/00; H01M 50/20; Y02E 60/10; F16F 15/002
(Continued)

(56) References Cited

U.S. PATENT DOCUMENTS 5,149,225 A 9/1992 Artzberger
5,220,257 A 6/1993 Yoshino et al.
(Continued)

FOREIGN PATENT DOCUMENTS

CN 204206792 U 3/2015
CN 205188931 U 4/2016
(Continued)

OTHER PUBLICATIONS

International Search Report and Written Opinion for Application No. PCT/US2020/059488 dated Apr. 28, 2021 (12 pages).
(Continued)

*Primary Examiner* — Gabriel Agared
(74) *Attorney, Agent, or Firm* — Michael Best & Friedrich LLP

(57) ABSTRACT

A gas engine replacement device includes a housing, a battery receptacle coupled to the housing to receive a battery pack, a motor within the housing, a power take-off shaft receiving torque from the motor and protruding from a side of the housing, a power switching network configured to provide power from the battery pack to the motor, and an electronic processor coupled to the power switching network and configured to control the power switching network to rotate the motor and to receive a command speed, determine whether the command speed is in an exclusion zone, set an output speed at the command speed responsive to the command speed being outside the exclusion zone, set the output speed to a speed outside the exclusion zone responsive to the command speed being in the exclusion zone, and control the power switching network to rotate the motor in accordance with the output speed.

14 Claims, 18 Drawing Sheets

(58) Field of Classification Search
USPC .......................................................... 318/465
See application file for complete search history.

(56) References Cited

U.S. PATENT DOCUMENTS

| | | | |
|---|---|---|---|
| 5,387,052 | A | 2/1995 | Artzberger |
| 5,787,693 | A | 8/1998 | Dyke |
| 5,816,741 | A | 10/1998 | Troppman, III |
| 9,154,009 | B2 | 10/2015 | Alemu |
| 10,469,000 | B2 * | 11/2019 | Bachmann .............. F02B 53/02 |
| 10,505,472 | B2 * | 12/2019 | Ahmed ................... H02P 6/085 |
| 2013/0046448 | A1 | 2/2013 | Fan et al. |
| 2014/0096986 | A1 | 4/2014 | Hirabayashi et al. |
| 2016/0087560 | A1 * | 3/2016 | Miller ..................... H02P 6/085 |
| | | | 318/400.06 |
| 2018/0138839 | A1 * | 5/2018 | Puzio .................... H02K 11/28 |
| 2019/0006980 | A1 | 1/2019 | Sheeks et al. |
| 2019/0238083 | A1 | 8/2019 | White et al. |
| 2020/0001446 | A1 | 1/2020 | Ballard et al. |
| 2020/0076337 | A1 | 3/2020 | Abbott et al. |
| 2020/0106373 | A1 * | 4/2020 | Schneider ............ G05B 19/416 |
| 2020/0313582 | A1 * | 10/2020 | Hattori ...................... H02P 6/06 |

FOREIGN PATENT DOCUMENTS

| | | |
|---|---|---|
| EP | 0101801 A1 | 3/1984 |
| GB | 2565271 A | 2/2019 |
| JP | S5180514 A | 7/1976 |
| JP | S5256702 A | 5/1977 |
| JP | S55120384 A | 9/1980 |
| JP | S5749378 A | 3/1982 |
| JP | H01224484 A | 9/1989 |
| JP | H04112694 A | 4/1992 |
| JP | H08340696 A | 12/1996 |
| JP | H093818 A | 1/1997 |
| JP | H11287497 A | 10/1999 |
| JP | H11311195 A | 11/1999 |
| JP | 2007223363 A | 9/2007 |
| JP | 2009284719 A | 12/2009 |
| JP | 2012131004 A | 7/2012 |
| JP | 2016008507 A | 1/2016 |
| JP | 6092392 B2 | 3/2017 |
| JP | 2017048768 A | 3/2017 |
| JP | 2019051579 A | 4/2019 |
| JP | 2019065458 A | 4/2019 |

OTHER PUBLICATIONS

Japanese Patent Office Action for Application No. 2022-525878 dated Sep. 5, 2023 (12 pages including machine English translation).

Extended European Search Report for Application No. 20886018.9 dated Oct. 24, 2023 (10 pages).

* cited by examiner

MOTOR CONTROL FOR GAS ENGINE REPLACEMENT DEVICE

RELATED APPLICATIONS

This application claims the benefit of U.S. Provisional Patent Application No. 62/932,711, filed Nov. 8, 2019, and U.S. Provisional Patent Application No. 63/009,642, filed Apr. 14, 2020, the entire content of each of which is hereby incorporated by reference.

FIELD

The present application relates to gas engine replacement motor units and, more particularly, to gas engine replacement motor units for use with power equipment.

BACKGROUND

Small, single or multi-cylinder gasoline engines can be mounted to power equipment to drive the equipment with a power take-off shaft.

SUMMARY

In some embodiments, a gas engine replacement device is provided including a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The electronic processor is configured to: receive a command speed for the motor, determine whether the command speed is in an exclusion zone, set an output speed for the motor at the command speed responsive to the command speed being outside the exclusion zone, set the output speed to a speed outside the exclusion zone responsive to the command speed being in the exclusion zone, and control the power switching network to rotate the motor in accordance with the output speed set based on whether the command speed was determined to be in the exclusion zone.

In some embodiments, the electronic processor is configured to set the output speed to an upper limit of the exclusion zone responsive to a previous output speed being greater than the exclusion zone. In some embodiments, the electronic processor is configured to set the output speed to a lower limit of the exclusion zone responsive to a previous output speed being less than the exclusion zone. In some embodiments, the exclusion zone defines a hysteresis around a resonant frequency of a mechanical system coupled to the motor. In some embodiments, the gas engine replacement device includes a vibration sensor, and the electronic processor is configured to identify the resonant frequency based on an output of the vibration sensor. In some embodiments, the gas engine replacement device includes a vibration sensor, and the electronic processor is configured to generate the exclusion zone based on an output of the vibration sensor.

In some embodiments, a gas engine replacement device is provided including a housing, a vibration sensor, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The electronic processor is configured to generate an exclusion zone based on an output of the vibration sensor, receive a command speed for the motor, determine an output speed for the motor based on the command speed to limit the operating speed to values outside the exclusion zone, and control the power switching network to rotate the motor in accordance with the determined output speed.

In some embodiments, the electronic processor is configured to set the output speed to an upper limit of the exclusion zone responsive to a previous output speed being greater than the exclusion zone. In some embodiments, the electronic processor is configured to set the output speed to a lower limit of the exclusion zone responsive to a previous output speed being less than the exclusion zone. In some embodiments, the exclusion zone defines a hysteresis around a resonant frequency of a mechanical system coupled to the motor. In some embodiments, the gas engine replacement device includes a vibration sensor, and the electronic processor is configured to identify the resonant frequency based on an output of the vibration sensor, and the exclusion zone is generated based on the identified resonant frequency.

In some embodiments, a system is provided including a pump and a gas engine replacement device. The gas engine replacement device including a housing, a battery receptacle coupled to the housing and configured to removably receive a battery pack, a motor located within the housing, a power take-off shaft receiving torque from the motor and protruding from a side of the housing and coupled to the pump, a power switching network configured to selectively provide power from the battery pack to the motor, and an electronic processor. The electronic processor is coupled to the power switching network and configured to control the power switching network to rotate the motor. The electronic processor is also configured to receive a command speed for the motor, determine whether the command speed is in an exclusion zone, set an output speed for the motor at the command speed responsive to the command speed being outside the exclusion zone, set the output speed to a speed outside the exclusion zone responsive to the command speed being in the exclusion zone, and control the power switching network to rotate the motor in accordance with the output speed set based on whether the command speed was determined to be in the exclusion zone.

In some embodiments, the electronic processor is configured to set the output speed to an upper limit of the exclusion zone responsive to a previous output speed being greater than the exclusion zone. In some embodiments, the electronic processor is configured to set the output speed to a lower limit of the exclusion zone responsive to a previous output speed being less than the exclusion zone. In some embodiments, the exclusion zone defines a hysteresis around a resonant frequency of a mechanical system coupled to the motor. In some embodiments, the gas engine replacement device includes a vibration sensor, and the electronic processor is configured to identify the resonant frequency based on an output of the vibration sensor, and the exclusion zone is generated based on the identified resonant frequency.

In some embodiments, a method is provided including receiving, by an electronic processor of a gas engine replacement device, a command speed for the motor. The method further includes determining, by the electronic processor, whether the command speed is in an exclusion zone. Further, the electronic processor sets an output speed for the motor at the command speed responsive to the command speed being outside the exclusion zone, and sets the output speed to a speed outside the exclusion zone responsive to the command speed being in the exclusion zone. The method further includes controlling, by the electronic processor, the power switching network to rotate a motor of the gas engine replacement device in accordance with the output speed set based on whether the command speed was determined to be in the exclusion zone.

In some embodiments of the method, the electronic processor sets the output speed to an upper limit of the exclusion zone responsive to a previous output speed being greater than the exclusion zone. In some embodiments of the method, the electronic processor sets the output speed to a lower limit of the exclusion zone responsive to a previous output speed being less than the exclusion zone. In some embodiments of the method, the exclusion zone defines a hysteresis around a resonant frequency of a mechanical system coupled to the motor. In some embodiments of the method, the gas engine replacement device includes a vibration sensor, and the electronic processor identifies the resonant frequency based on an output of the vibration sensor. In some embodiments, the gas engine replacement device includes a vibration sensor, and the electronic processor generates the exclusion zone based on an output of the vibration sensor.

In some embodiments, a gas engine replacement device is provided including a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The electronic processor is configured to receive a command speed for the motor, generate an output speed for the motor based on the command speed, detect a run-away condition, and mitigate the run-away condition.

In some embodiments, a method for operating a gas engine replacement device is provided, where the gas engine replacement device includes a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The method includes the gas engine replacement device receiving a command speed for the motor, generating an output speed for the motor based on the command speed, detecting a run-away condition, and mitigating the run-away condition.

In some embodiments, a gas engine replacement device is provided including a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The electronic processor is configured to monitor a motor current, estimate a load condition based on the motor current, and set a motor command speed based on the load condition.

In some embodiments, a method for operating a gas engine replacement device is provided, where the gas engine replacement device includes a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The method includes the gas engine replacement device monitoring a motor current, estimating a load condition based on the motor current, and setting a motor command speed based on the load condition.

In some embodiments, a gas engine replacement device is provided including a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The electronic processor is configured to receive a position control command, determine a load position, and control the motor based on the load position.

In some embodiments, a method for operating a gas engine replacement device is provided, where the gas engine replacement device includes a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor. The electronic processor is coupled to the power switching network and configured to control the power switching network to rotate the motor. The method includes the gas engine replacement device receiving a position control command, determining a load position, and controlling the motor based on the load position.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software-based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments.

Other features and aspects will become apparent by consideration of the following detailed description and accompanying drawings.

DETAILED DESCRIPTION

Figure 1:
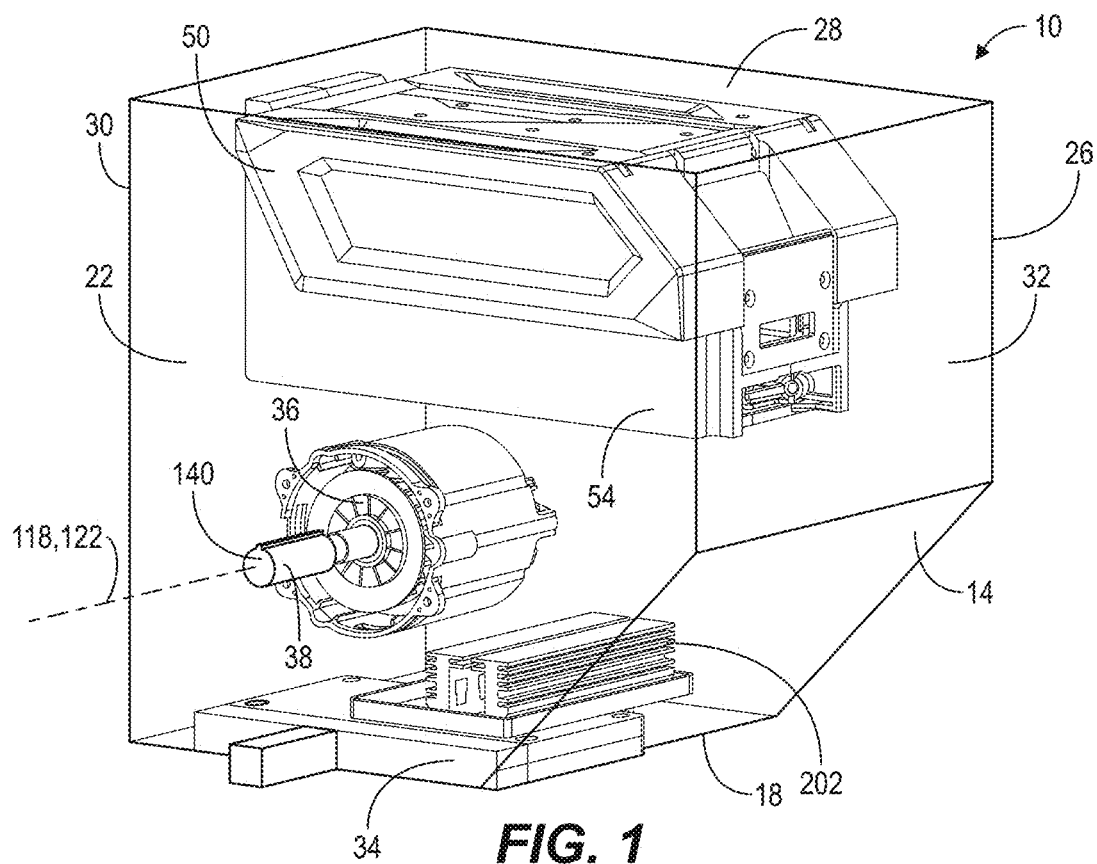
FIG. 1 is a perspective view of a gas engine replacement device in accordance with an embodiment.
Figure 2:
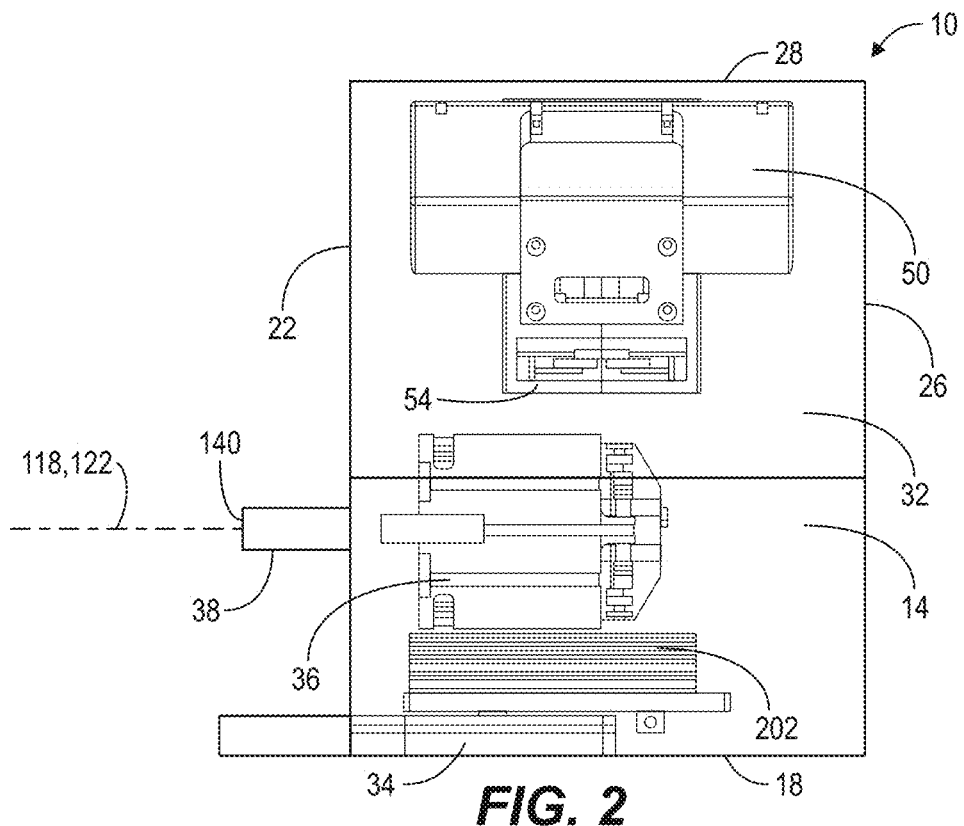
FIG. 2 is a plan view of the gas engine replacement device of FIG. 1.
Figure 3:
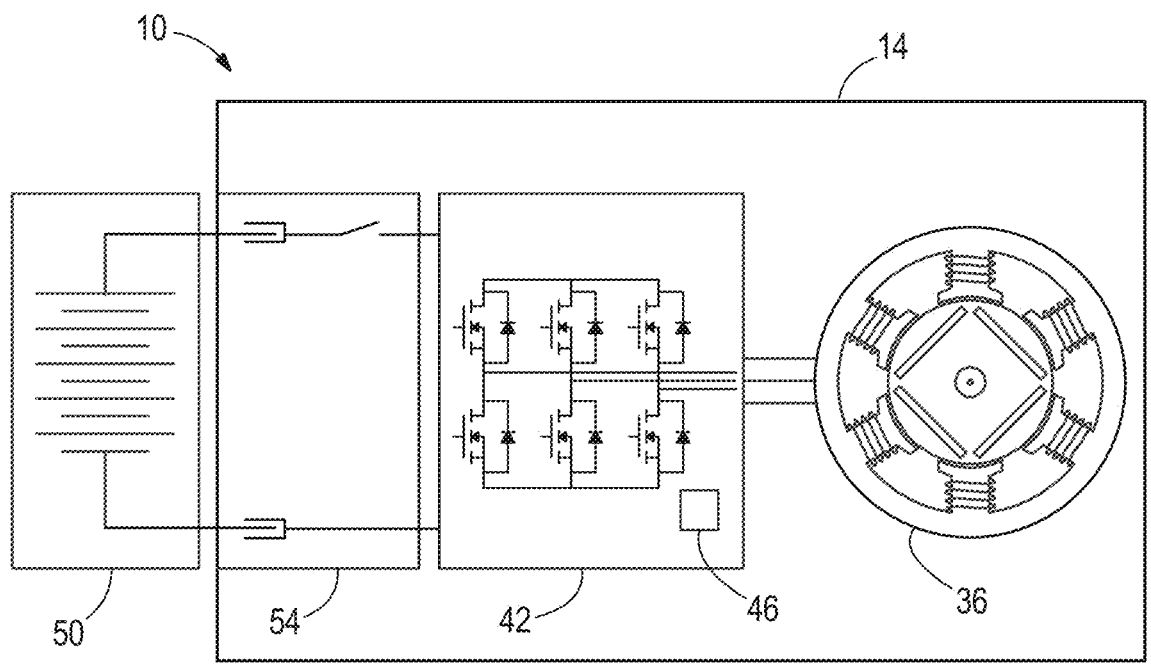
FIG. 3 is a schematic view of the gas engine replacement device of FIG. 1.

As shown in FIGS. 1 and 2, a gas engine replacement device 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. patent application Ser. No. 16/551,197, filed Aug. 26, 2019, the entire content of which is incorporated herein by reference.

Figure 4:
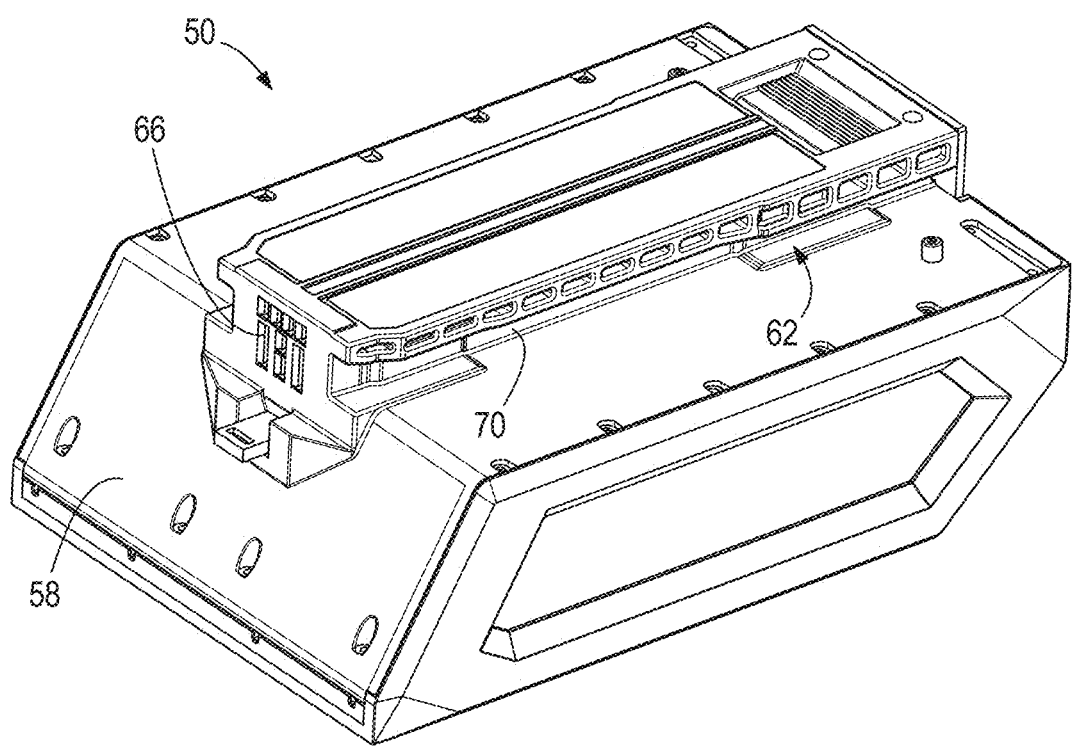
FIG. 4 is a perspective view of a battery pack of the gas engine replacement device of FIG. 1.
Figure 5:
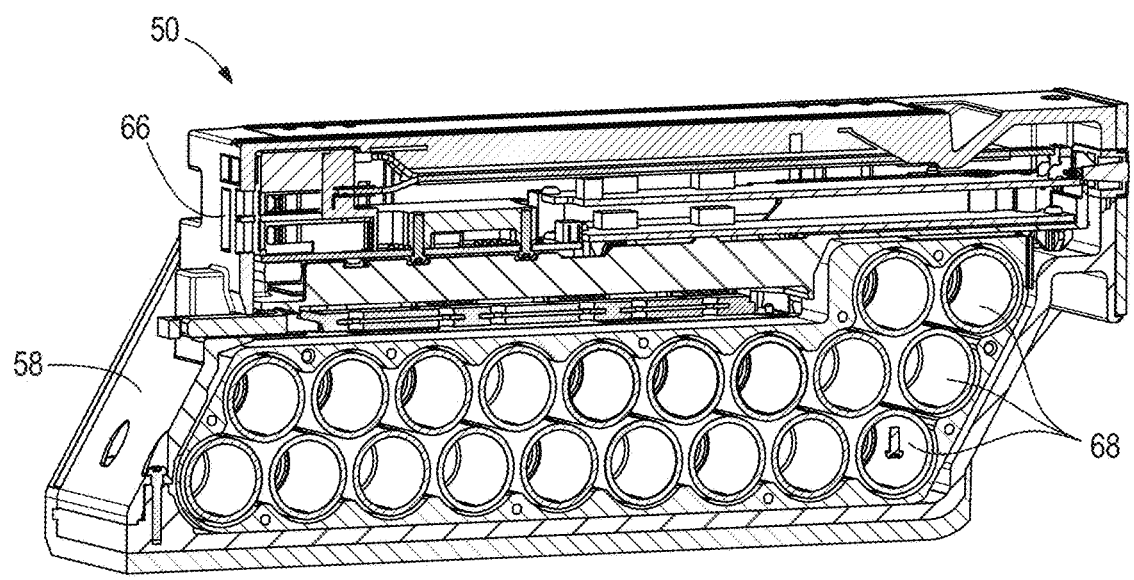
FIG. 5 is a cross-sectional view of the battery pack of FIG. 4.
Figure 6:
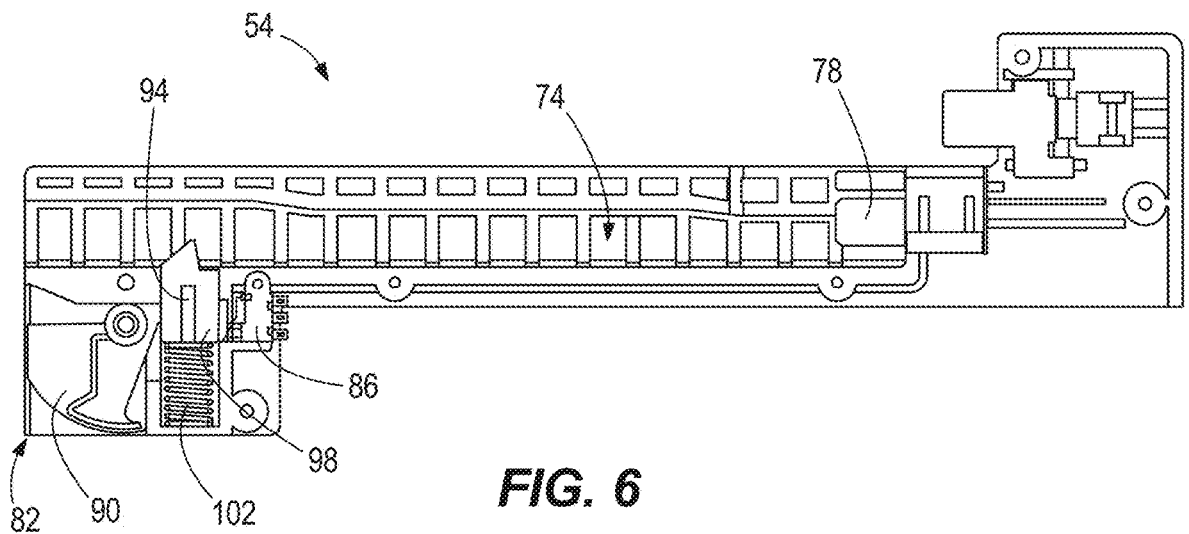
FIG. 6 is a cross-sectional view of a battery receptacle of the gas engine replacement device of FIG. 1.

As shown in FIGS. 1-6, the gas engine replacement device 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S.

Patent Publication No. 2019/0006980 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the gas engine replacement device 10 in accordance with some embodiments. The battery receptacle 54 includes the projection/recess 74, a second terminal 78, a latching mechanism 82, and a power disconnect switch 86. The projection/recess 74 cooperates with the projection/recess 70 of the battery pack 50 to attach the battery pack 50 to the battery receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the gas engine replacement device 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 98 of the receptacle 54 and is biased toward a latching position by a biasing member 102 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10. When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
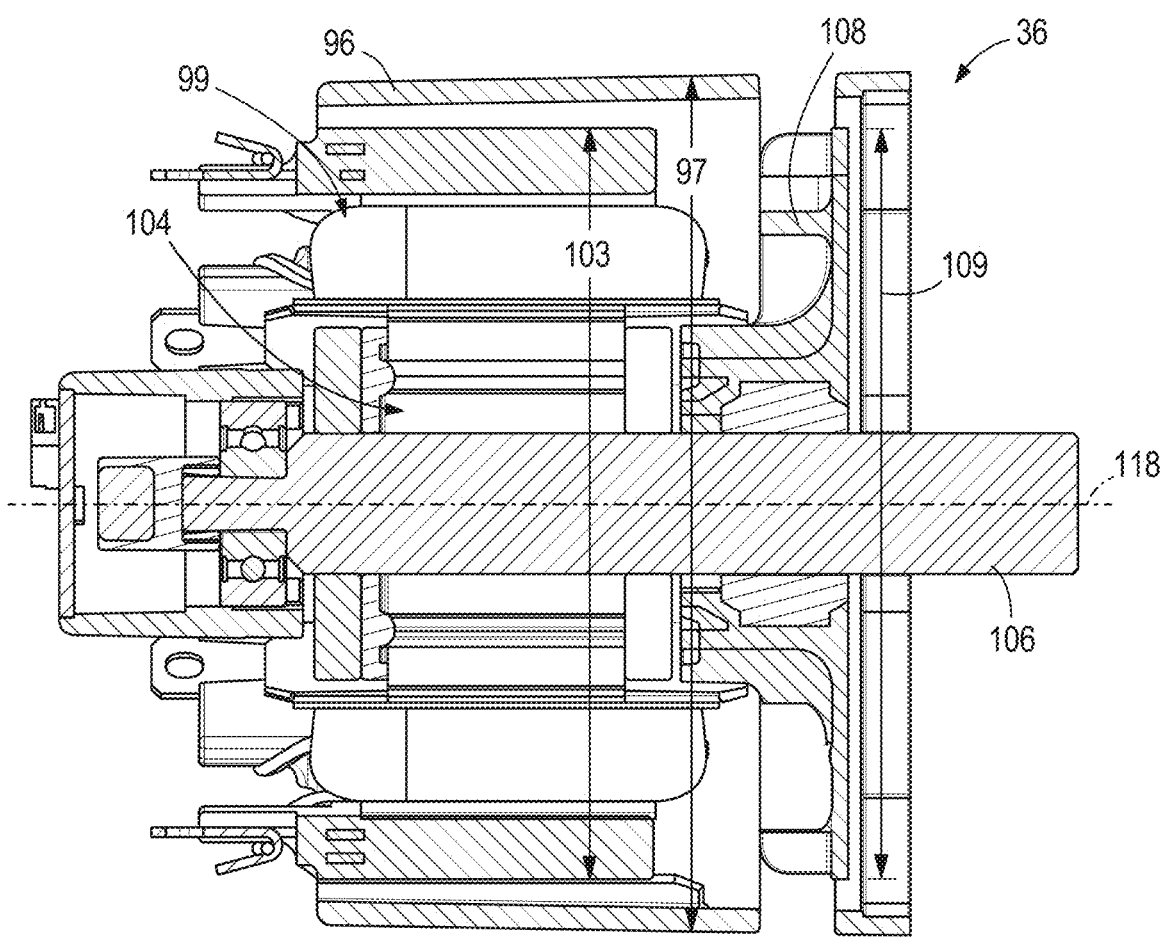
FIG. 7 is a cross-sectional view of a motor of the gas engine replacement device of FIG. 1.

As shown in FIG. 7, the motor 36 includes a motor housing 96 having an outer diameter 97, a stator 99 having a nominal outer diameter 103 of up to about 80 mm, a rotor 104 having an output shaft 106 and supported for rotation within the stator 99, and a fan 108. A similar motor is described and illustrated in U.S. Patent Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor) of up to about 80 mm.

Figure 8:
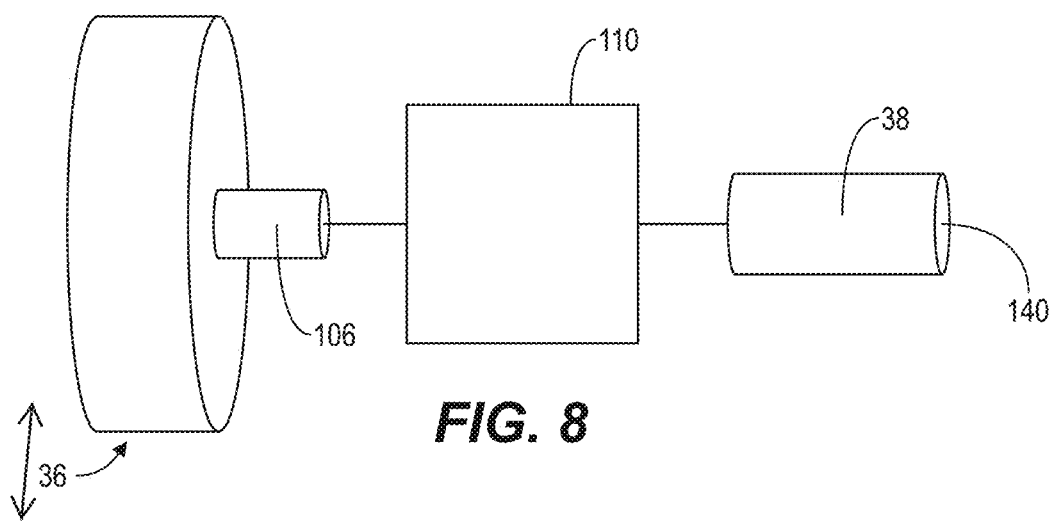
FIG. 8 is a schematic view of a motor, a gear train, and a power take-off shaft of the gas engine replacement device of FIG. 1.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators (not shown). In some embodiments, the gas engine replacement device 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 104 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius. Tables 1 and 2 below list with further specificity the temperature limits of different components on the housing 14 of the gas engine replacement device 10.

Table 1 below lists the Underwriter's Laboratories (UL) temperature limits of different components typically used in power tools, with respect to whether those components are formed of metal, plastic, rubber, wood, porcelain, or vitreous. For example, at least in some embodiments, the plastic rated temperatures are never exceeded by the gas engine replacement device 10.

TABLE 1

| | Metal | Plastic/ Rubber/ Wood | Porcelain/ Vitreous |
|---|---|---|---|
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 2 below lists the UL temperature limits of different components of the battery pack housing 58 of the battery pack 50, with respect to whether those components are formed of metal, plastic or rubber. For example, at least in some embodiments, the plastic rated temperatures are never exceeded by the gas engine replacement device 10.

TABLE 2

| | Metal | Plastic/ Rubber |
|---|---|---|
| Casual Contact | 70° C. | 95° C. |
| Handles and knobs that are continuously held | 55° C. | 75° C. |
| Handles and knobs that are only briefly held (i.e. switches) | 60° C. | 85° C. |

Figure 9:
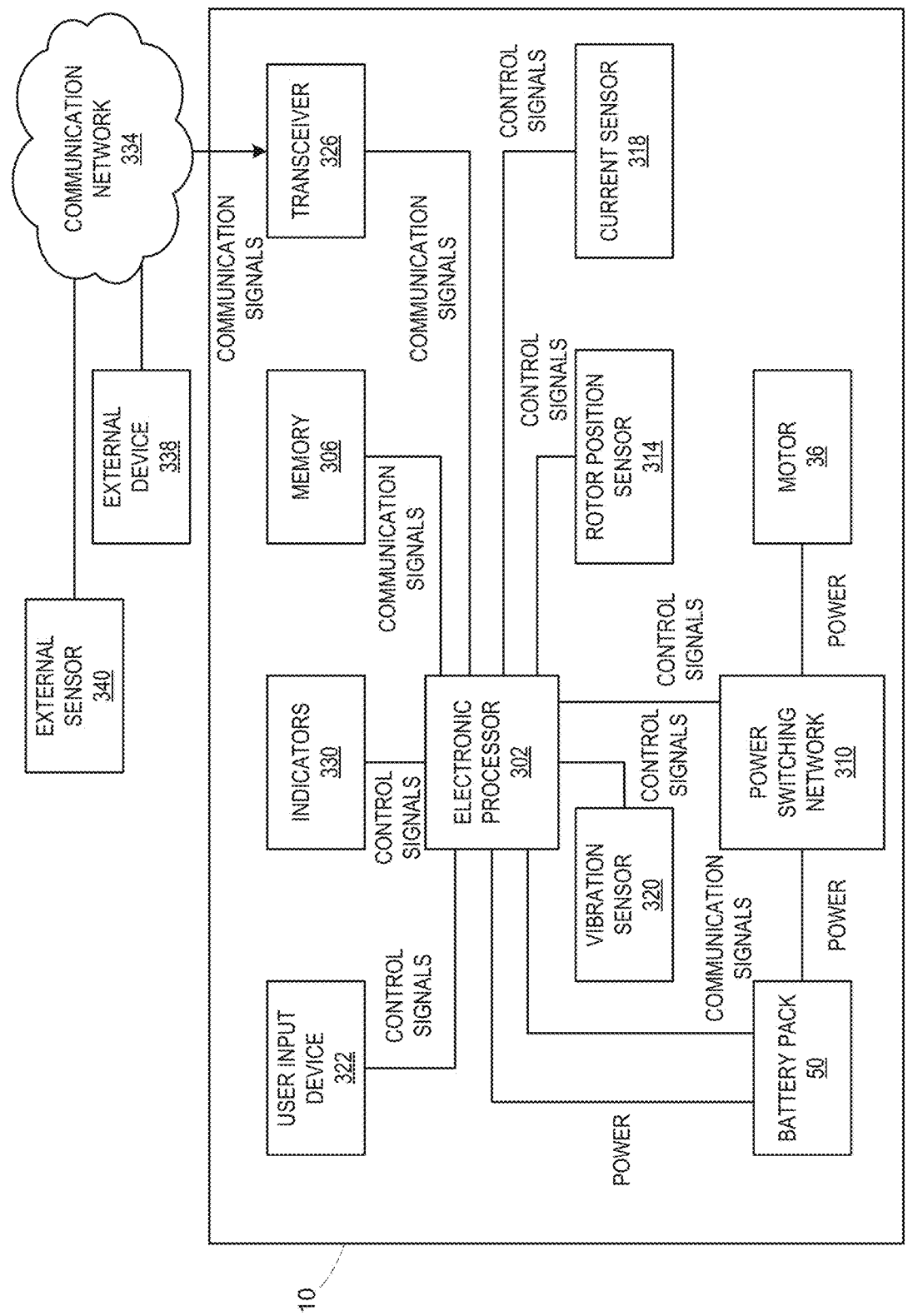
FIG. 9 is a block diagram of the gas engine replacement device of FIG. 1.

FIG. 9 illustrates a simplified block diagram of the gas engine replacement device 10 according to one example embodiment. As shown in FIG. 9, the gas engine replacement device 10 includes an electronic processor 302, a memory 306, the battery pack 50, a power switching network 310, the motor 36, a rotor position sensor 314, a current sensor 318, a user input device 322 (e.g., a throttle, trigger, or power button), a transceiver 326, indicators 330 (e.g., light-emitting diodes), and a vibration sensor 320. In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, current sensor 318, user input device 322, transceiver 326, indicators 330, and vibration sensor 320 form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably attached to the housing of the gas engine replacement device 10 such that a different battery pack 50 may be attached and removed to the gas engine replacement device 10 to provide different amount of power to the gas engine replacement device 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-8.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge (see FIG. 10) that receives pulse-width modulated (PWM) signals from the electronic processor 302 to drive the motor 36.

The rotor position sensor 314 and the current sensor 318 are coupled to the electronic processor 302 and communicate to the electronic processor 302 various control signals indicative of different parameters of the gas engine replacement device 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor.

The current sensor 318 monitors or detects a current level of the motor 36 during operation of the gas engine replacement device 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device 338 (e.g., a smart phone, tablet, or laptop computer) over a wired or wireless communication network 334. In some embodiments, the transceiver 326 may comprise separate transmitting and receiving components. In some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302. In some embodiments, the transceiver 326 communicates with one or more external sensors 340 via the communication network 334. For example, an external sensor 340 may be associated with the equipment to which the gas engine replacement device 10 is mounted. In some embodiments, the external sensor 340 is a speed sensor, a position sensor, or the like.

The communication network 334 provides a wired or wireless connection between the gas engine replacement device 10, the external device 338, and the external sensor 340. The communication network 334 may comprise a short-range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, etc. The indicators 330 may also include elements to convey information to a user through audible or tactile outputs. In some embodiments, the indicators 330 include an eco-indicator that indicates an amount of power being used by the load during operation.

The connections shown between components of the gas engine replacement device 10 are simplified in FIG. 9. In practice, the wiring of the gas engine replacement device 10 is more complex, as the components of a gas engine replacement device are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

Figure 10:
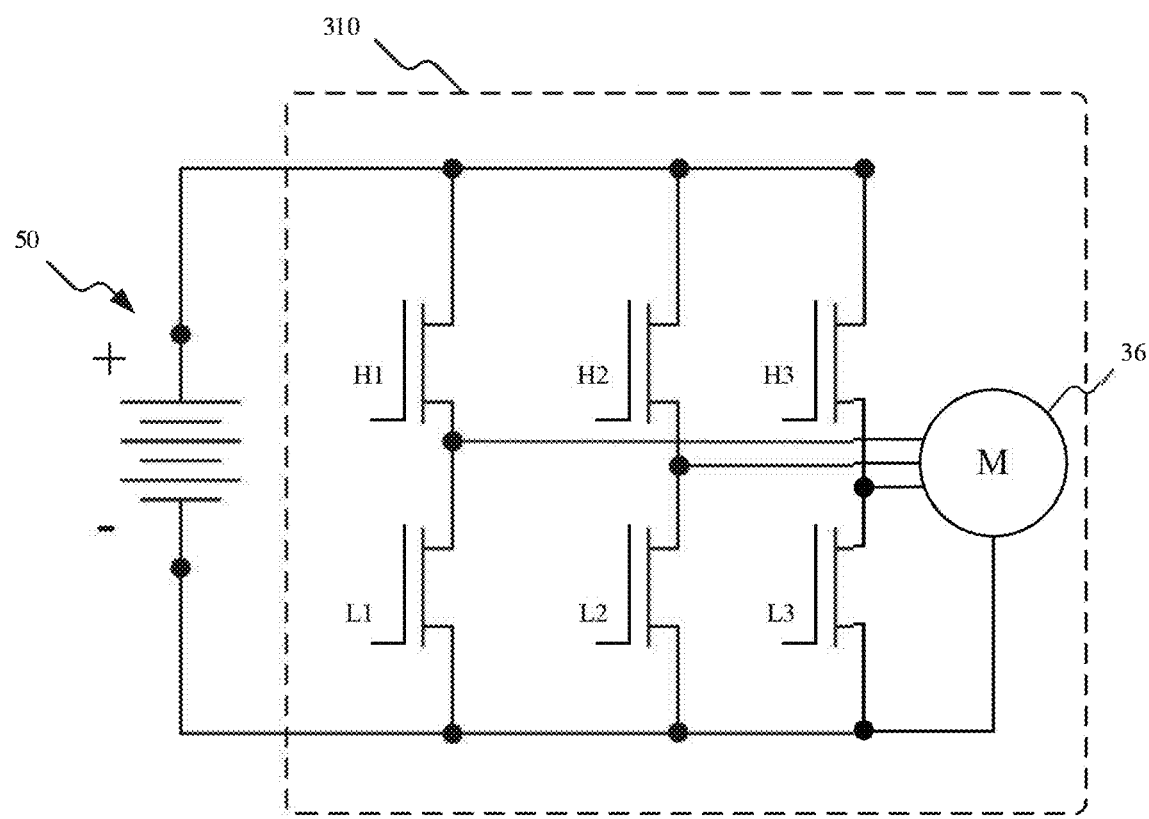
FIG. 10 is a schematic view of a power switching network for driving the motor of the gas engine replacement device of FIG. 1.

FIG. 10 illustrates one example of the power switching network 310 for driving the motor 36 of the gas engine replacement device 10. The power switching network 310 includes three high side FETs, H1, H2, and H3, and three low-side FETs, L1, L2, and L3 each having a first or conducting state and a second or non-conducting state. The power switching network 210 is used to selectively apply power from the battery pack 50 to the motor 36. An example manner in which the high-side switches and the low-side switches are controlled for operating the motor 36 in forward and reverse directions is described below.

Figure 11A:
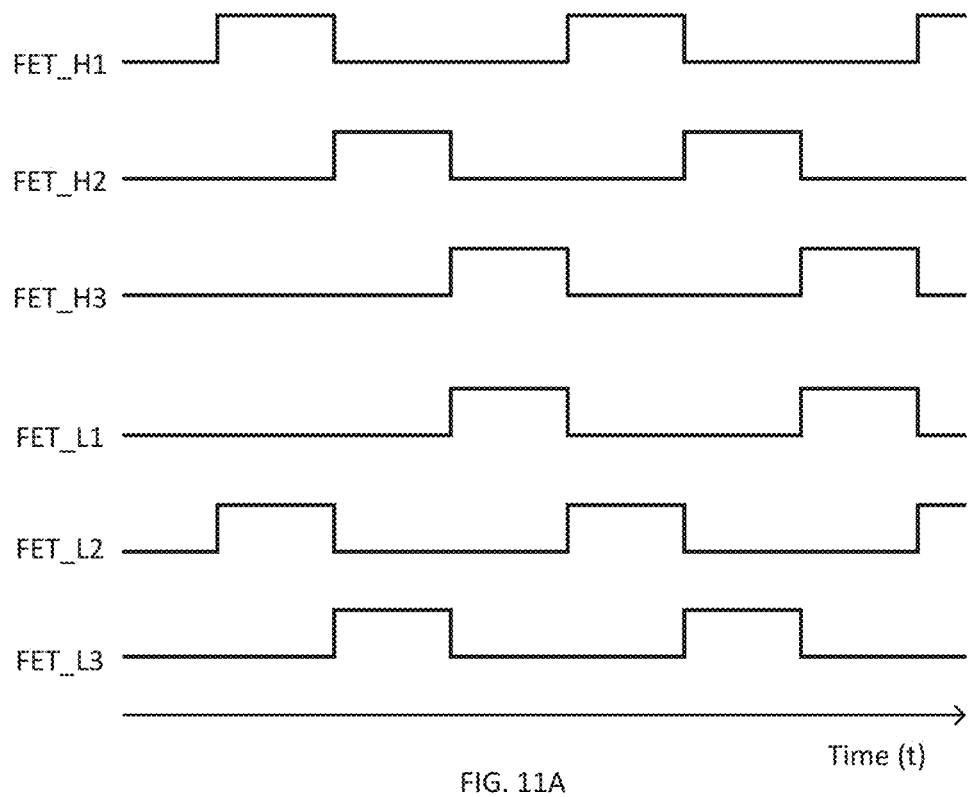
FIG. 11A is a diagram illustrating the operation of the power switching network of FIG. 10 during a forward operation of a motor.

The high-side switches and the low side switches may be controlled using (Pulse-Width Modulated) PWM commutation, centerline commutation, or other commutations schemes. FIG. 11A illustrates a simple PWM commutation to control the motor 36 to rotate in a forward direction. As shown in FIG. 11A, each of the high-side FETs H1, H2, and H3 is periodically conducting for an entire commutation phase. When one of the FETs H1, H2, and H3 stops conducting, the next high-side FET begins conducting. Similarly, each of the low-side FETs L1, L2, and L3 is periodically conducting for an entire commutation phase. When one of the FETs L1, L2, and L3 stops conducting, the next low-side FET begins conducting. However, one or both the high-side or low-side FETs may be activated for only a period of the commutations phase (e.g., with a PWM signal having a 75%, 50%, 25%, or another duty ratio) based on the desired speed of the motor 36 or the load on the motor 36.

Figure 11B:
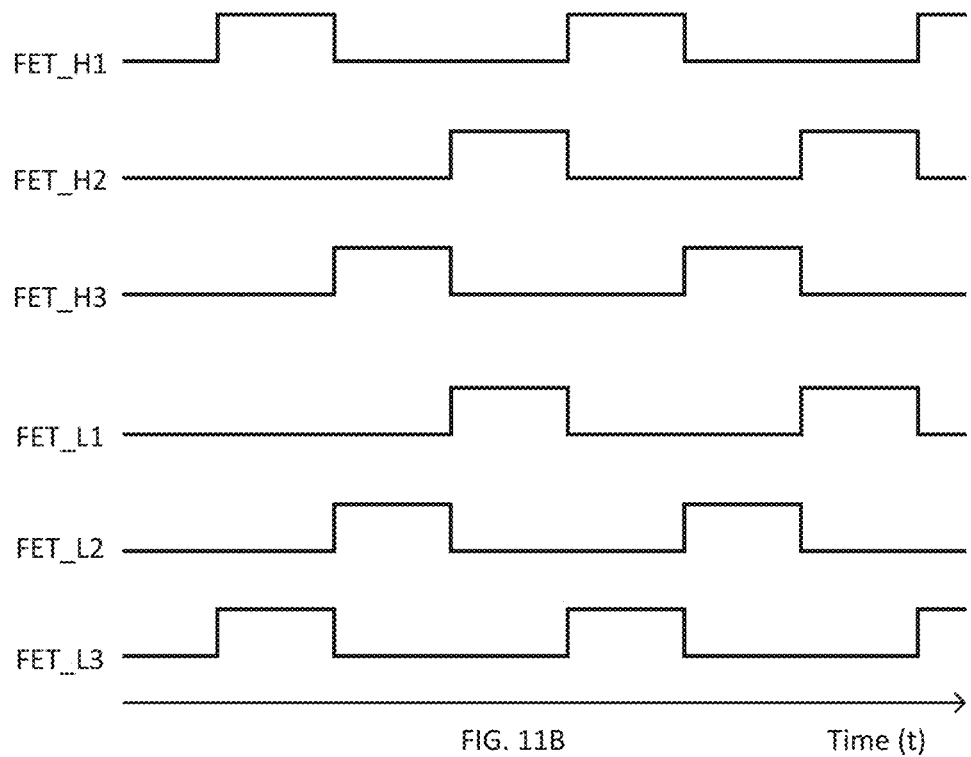
FIG. 11B is a diagram illustrating the operation of the power switching network of FIG. 10 during a reverse operation of a motor.

In the example illustrated, to drive the motor 36 in a forward direction, the high-side and low-side FETs are activated in predetermined pairs and in a predetermined sequence. In the example illustrated in FIG. 11A, H1 and L2 are first activated, followed by H2 and L3 being activated next, and followed by H3 and L1 being activated next. This sequence is continued for the duration of the runtime of the motor 36 in the forward operation. FIG. 11B illustrates a simple PWM commutation to control the motor 36 to rotate in a reverse direction. In the example illustrated in FIG. 11B, H1 and L3 are first activated, followed by H3 and L2 being activated next, and followed by H2 and L1 being activated next. This sequence is continued for the duration of the runtime of the motor 36 in the reverse operation. In some embodiments, one or more variations to the sequence can be performed based on the desired motor operation. For example, one or both of the high-side and low-side FETs may be switched at a frequency during their activation phase to control the speed of the motor. Additionally, the activation phases of the high-side and low-side FETs may be shifted to create an overlap with other activations to achieve different controls (e.g., field-oriented control).

Figure 12:
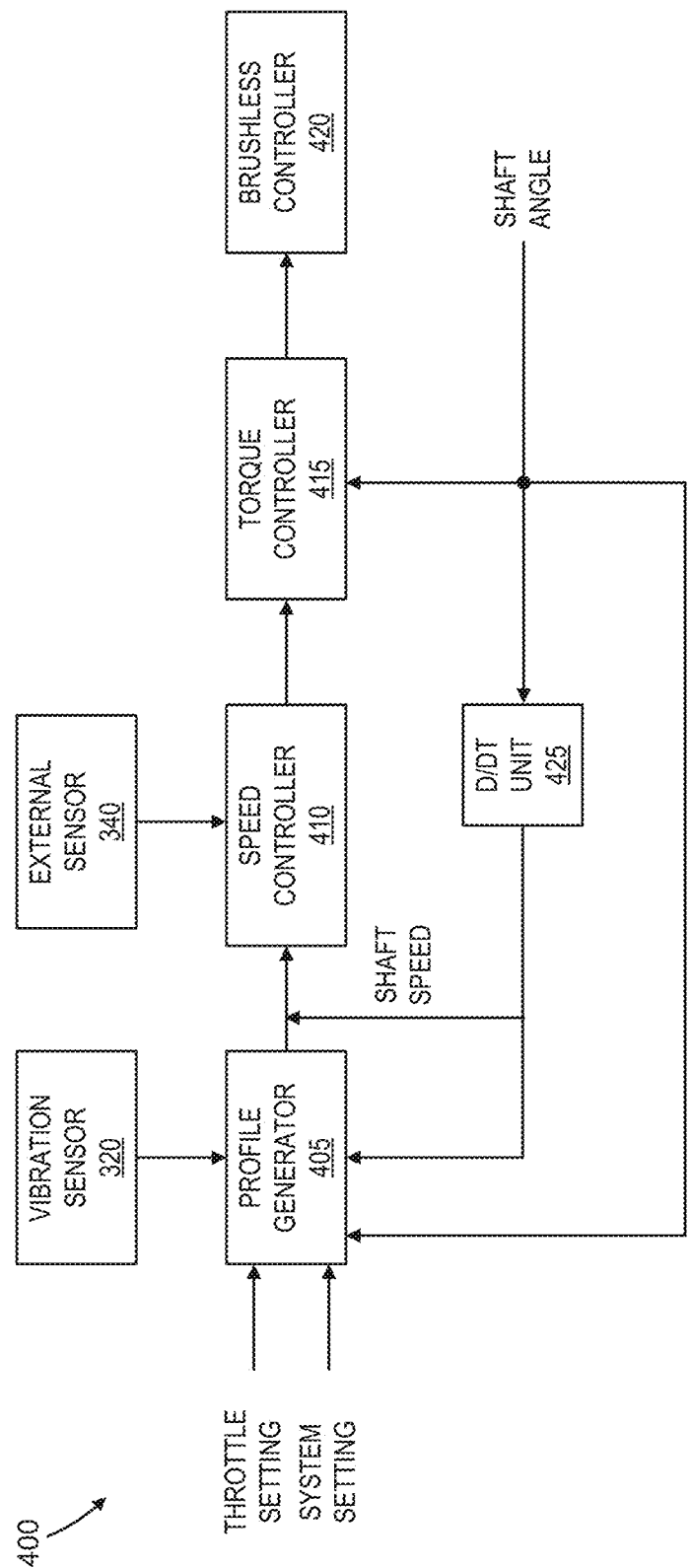
FIG. 12 is a simplified block diagram of a motor controller of the gas engine replacement device of FIG. 1.

FIG. 12 is a simplified block diagram of a motor controller 400 that is, in some embodiments, implemented by software stored in the memory 306 and executed by the electronic processor 302. The motor controller 400 includes a profile generator 405, a speed controller 410, a torque controller 415, a brushless controller 420, and a D/DT unit 425. In some embodiments, the D/DT unit 425 calculates a derivative of the shaft angle to determine the shaft speed. The profile generator 405 receives a throttle setting (e.g., from the user input device 322) and a system setting. The profile generator 405 generates a speed reference for the speed controller 410 and a torque reference for the torque controller 415. The profile generator 405 aligns the speed and torque control with the particular features of the mechanical system coupled to the motor 36.

The torque controller 415 receives shaft angle feedback from the rotor position sensor 314, and the speed controller 410 receives shaft speed feedback from the D/DT unit 425. The brushless controller 420 receives the speed and torque outputs of the speed controller 410 and the torque controller 415 and generates control signals for the power switching network 310 as described above. For example, the brushless controller 420 may generate a sequence of PWM signals for each of the power switching elements of the power switching network 310 to drive the motor 36. The motor controller 400 provides independent speed and torque control over a wide operating range. The motor controller 400 allows operation over a wide speed range, which exceeds the typical speed range of an internal combustion engine. For example, while reciprocating engines are limited to a small operating speed and torque delivery range, the motor controller 400 provides nearly infinite speed range with full torque control over the range without the need for complex gearboxes or speed reducers common in systems driven by internal combustion engines. Since the motor controller 400 can produce rated torque at or slightly above stall speeds, slow speed operation for jog and inching applications is supported.

The profile generator 405 allows the use of a speed profile that is consistent with the mechanical system, thereby allowing features such as detection of pump cavitation or water hammer in a pumping application, nonlinear speed and torque relationships for fans and pumps, torque limiting and control for lifting and tension winding applications. In some embodiments, to mitigate damage to the mechanical system, the motor controller 400 detects stalls or jams and limits the torque output by the torque controller 415. The motor controller 400 allows for smooth acceleration and closed loop regulation of speed, as compared to mechanical systems operated by internal combustion engines that require imprecise mechanical governors. The motor controller 400 provides load independent speed control, thereby allowing constant speed operation under load (e.g., for cutting or finishing applications). In some embodiments, the profile generator 405 receives shaft speed, shaft angle, or both.

Figure 13:
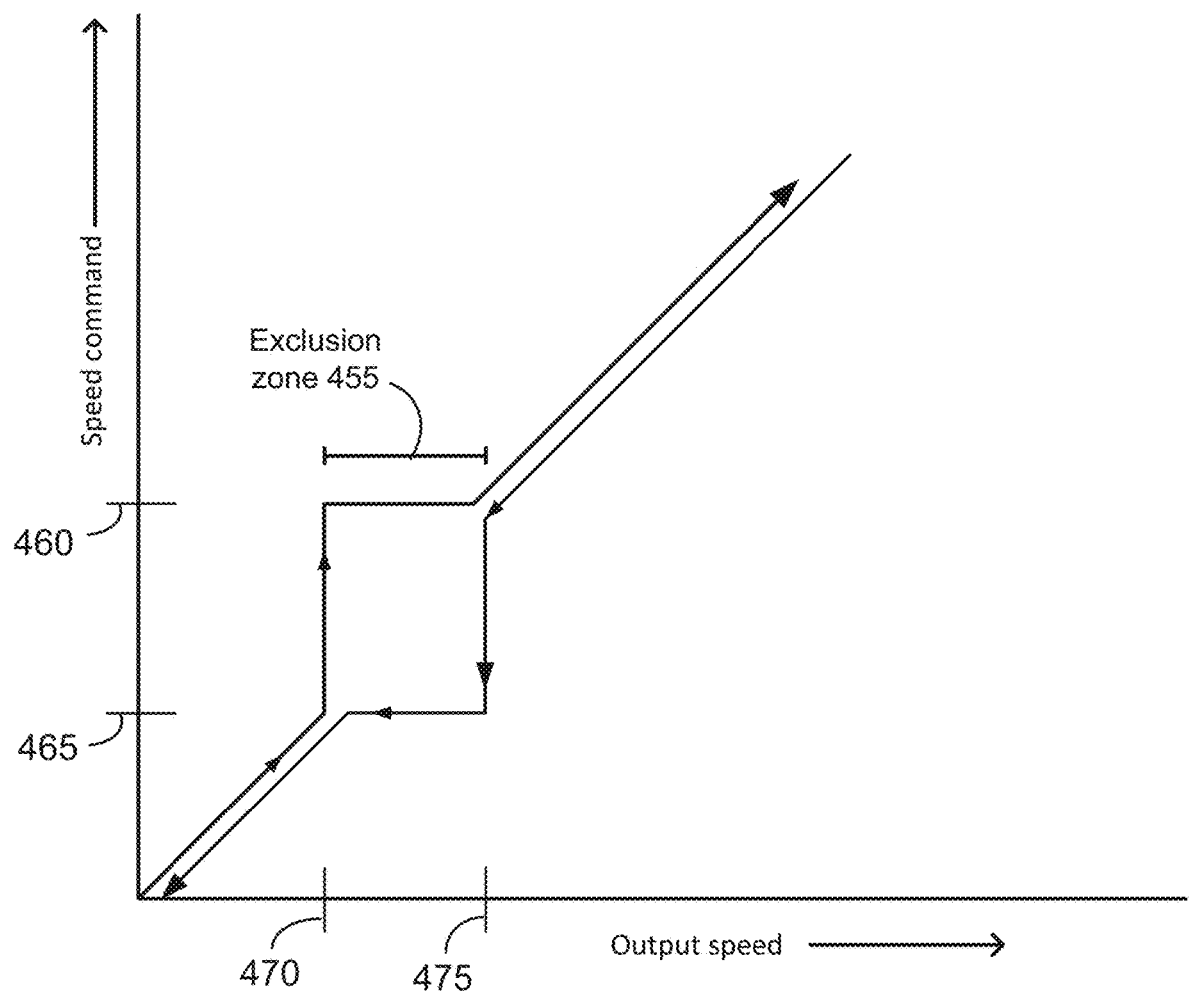
FIG. 13 is a diagram illustrating a speed profile used by the motor controller of FIG. 12.
Figure 14:
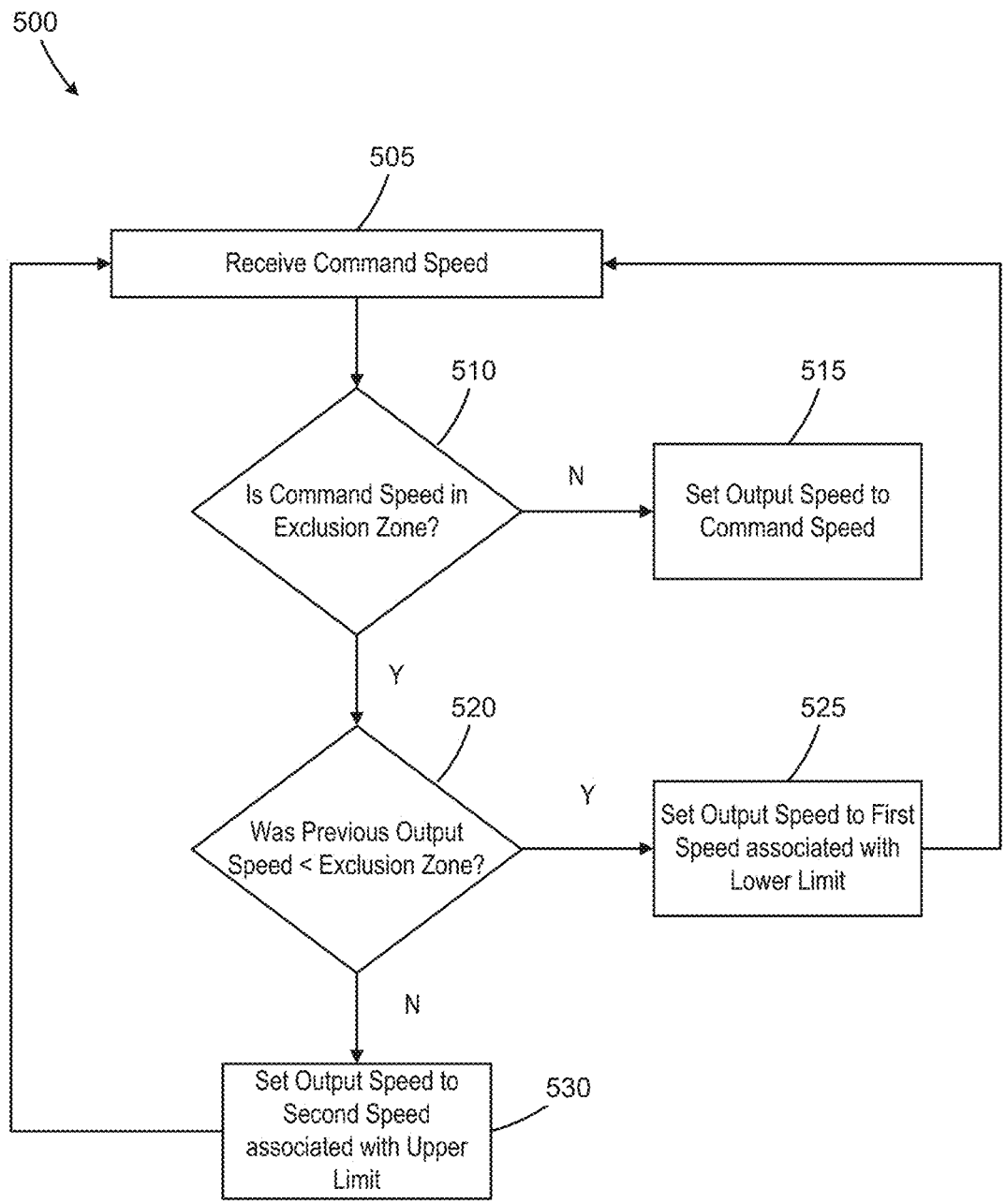
FIG. 14 is a flowchart of an example method for speed control of the motor of the gas engine replacement device of FIG. 1.

Referring to FIGS. 13 and 14, the motor controller 400 employs a skip speed technique to avoid mechanical resonances inherent in the mechanical system coupled to the motor 36. FIG. 13 is a diagram 450 illustrating a speed profile used by the profile generator 405, according to some embodiments. FIG. 14 is a flowchart 500 of an example method for speed control of the motor 36.

Mechanical systems often have rotational speeds that are related to the natural resonant frequency of the mechanical system. Operation at these speeds can cause excessive wear and failure of the mechanical system. In typical internal combustion engine applications, vibration dampers or other methods may be used to prevent damage from mechanical vibration. The motor controller 400, in some embodiments, is programmed to avoid the speeds that cause mechanical resonance and mitigate the need for vibration damping equipment. The profile generator 405 provides a speed profile that avoids predetermined programmed speed ranges. In one embodiment, the profile generator 405 provides a speed command with hysteresis.

The profile generator 405 receives the command speed (e.g., determined by the throttle setting or the system setting) and generates an output speed for the speed controller 410. As illustrated in FIG. 13, the command speed and the output speed track until the command speed approaches a skip speed. An exclusion zone 455 is defined corresponding to a programmed speed range (e.g., bounding a skip speed or resonant frequency defined for the mechanical system). For example, the exclusion zone 455 is defined by an upper speed limit 460 and a lower speed limit 465. Even though the command speed continues to increase, the profile generator 405 maintains the output speed at a first (lower) speed value 470 until the command speed exceeds the upper limit 460 of the exclusion zone 455. The first (lower) speed value 470 is the speed value associated with command speed at the lower speed limit 465. After the command speed exceeds the exclusion zone 455, the output speed increases to match the command speed. The profile generator 405 implements the exclusion zone for both increasing command speed and decreasing command speed. For example, when the command speed decreases to and below the upper limit 460, the profile generator 405 maintains the output speed at a second (higher) speed value 475 until the command speed reduces below the lower limit 465 of the exclusion zone 455. The second (higher) speed value 470 is the speed value associated with command speed at the upper speed limit 460. After the command speed reduces below the exclusion zone 455, the output speed decreases to match the command speed. In some embodiments, multiple exclusion zones may be implemented by the profile generator 405.

In some embodiments, the exclusion zone 455 is preprogrammed into the profile generator 405. For example, the upper and lower limits of the exclusion zone may be determined based on vibration testing of a particular mechanical system into which the gas engine replacement device 10 is to be included, and the limits saved to the memory 306. In other embodiments, the profile generator 405 employs the vibration sensor 320 (see FIG. 9) to measure the vibration of the mechanical system. In some embodiments, the profile generator 405 employs the exclusion zone 455 in response to the output of the vibration sensor 320 exceeding a vibration limit. In some embodiments, the profile generator 405 uses a learning technique that dynamically sets exclusion zones 455 as data regarding the vibration characteristics of the mechanical system is collected by the vibration sensor 320 over time.

In some embodiments, the profile generator 405 determines the exclusion zone 455 dynamically based on the real time output of the vibration sensor 320. If the vibration sensor 320 measures a vibration above a first threshold, the profile generator 405 limits the output speed at a first value, thereby setting a first limit of the exclusion zone 455 (i.e., upper limit if command speed is decreasing or lower limit if command speed is increasing). As the command speed continues to change, the profile generator 405 sets the output speed to a provisional command speed and determines if the vibration sensor 320 measures a vibration below the first threshold. If the vibration level does not fall below the first threshold at the provisional command speed, the profile generator 405 determines that the gas engine replacement device 10 is still in the exclusion zone 455 and returns the output speed to the first value. If the vibration level falls below the first threshold at the provisional command speed, the profile generator 405 determines that the second limit of the exclusion zone has been passed and allows continued operation at the provisional command speed. In some embodiments, the profile generator 405 sets provisional command speeds at predetermined increments of change of the command speed until the second limit is passed.

As noted, the flowchart 500 of FIG. 14 is for a method of speed control of the motor 36. The flowchart 500 is described with respect the motor controller 400 of FIG. 12 implemented on the gas engine replacement device 10 and with the exclusion zone as generally illustrated in FIG. 13. However, in some embodiments, the method of the flowchart 500 is implemented by other devices or variations of the motor controller 400, and in some embodiments, the flow chart is implemented with an exclusion zone taking a form different form that shown in FIG. 13. Referring to FIG. 14, at block 505, the profile generator 405 receives the command speed for the motor 36 (e.g., indicated by the throttle setting or the system setting, as previously described). For example, in some embodiments, the throttle setting and system setting are values that are representative of desired speed for the motor 36.

At block 510, the profile generator 405 determines whether the command speed is in an exclusion zone (at block 510). For example, the profile generator 405 compares the command speed received in block 505 to an exclusion zone defined by the upper speed limit 460 and a lower speed limit 465. When the profile generator 405 determines, based on the comparison, that the command speed is greater than the lower speed limit 465 and lower than the upper speed limit 460, the profile generator determines that the command speed is in the exclusion zone. Responsive to determining that the command speed is not in the exclusion zone, the profile generator 405 sets the output speed to the command speed (at block 515).

Responsive to determining that the command speed is in the exclusion zone, the profile generator 405 determines whether the previous output speed was lower than the exclusion zone (at block 520) (i.e., approaching from below). Responsive to determining that the previous output speed was lower than the exclusion zone, the profile generator sets the command speed to the lower limit 465, thereby setting the output speed to the first (lower) speed 470 associated with the lower limit 465 (at block 525). Stated another way, at block 525, the profile generator sets the output speed to the lower limit of the exclusion zone. If the previous output speed was not lower than the exclusion zone (i.e., approaching from above), the profile generator sets the command speed to the upper limit 460, thereby setting the output speed to the second (higher) speed 475 of the exclusion zone (at block 530). Stated another way, at block 530, the profile generator sets the output speed to the upper limit of the exclusion zone.

The profile generator 405 receives the next command speed (at block 505) and repeats the speed limiting until the command speed is no longer in the exclusion zone (at block 515).

As noted above, in some embodiments, the flow chart 500 is implemented with an exclusion zone taking a form different form that which is shown in FIG. 13. For example, in some embodiments, multiple exclusion zones are implemented, each with its own upper and lower speed limits and associated first and second speeds. In such embodiments, in block 510, the profile generator 405 determines whether the command speed is in any one of the exclusion zones using similar comparison functions as noted above with respect to determining whether the command speed is in the exclusion zone 455, albeit with different limits for the various exclusion zones. Furthermore, in blocks 525 and 530, the output speed is set to the first or second speed, respectively, associated with the exclusion zone in which the command speed was determined to be.

Figure 15:
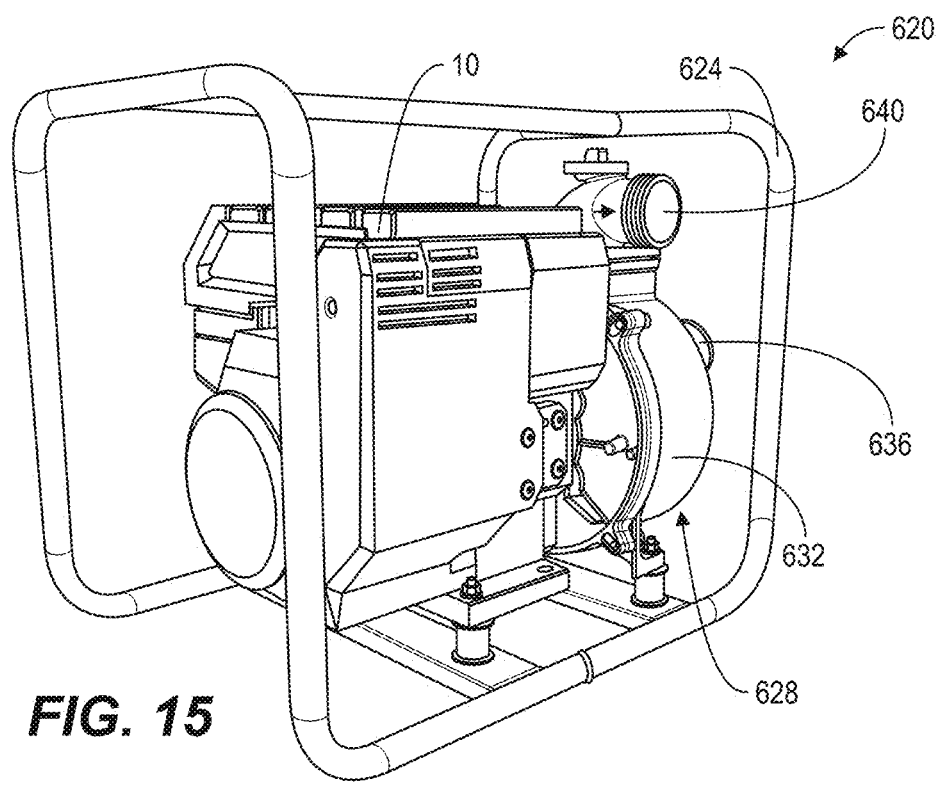
FIG. 15 illustrates a pump system including the gas engine replacement device of FIG. 1.

FIG. 15 illustrates a pump system 620 including a frame 624 supporting the gas engine replacement device 10 and a pump 628 with the gas engine replacement device 10 operable to drive the pump 628. The illustrated pump 628 is a centrifugal pump having an impeller positioned within a housing 632 of the pump 628 that is rotatable about an axis to move material from an inlet 636 of the pump 628 to an outlet 640 of the pump 628. In some embodiments, the gas engine replacement device 10 of the pump system 620 implements the motor control described above with respect to FIGS. 12-14.

Figure 16:
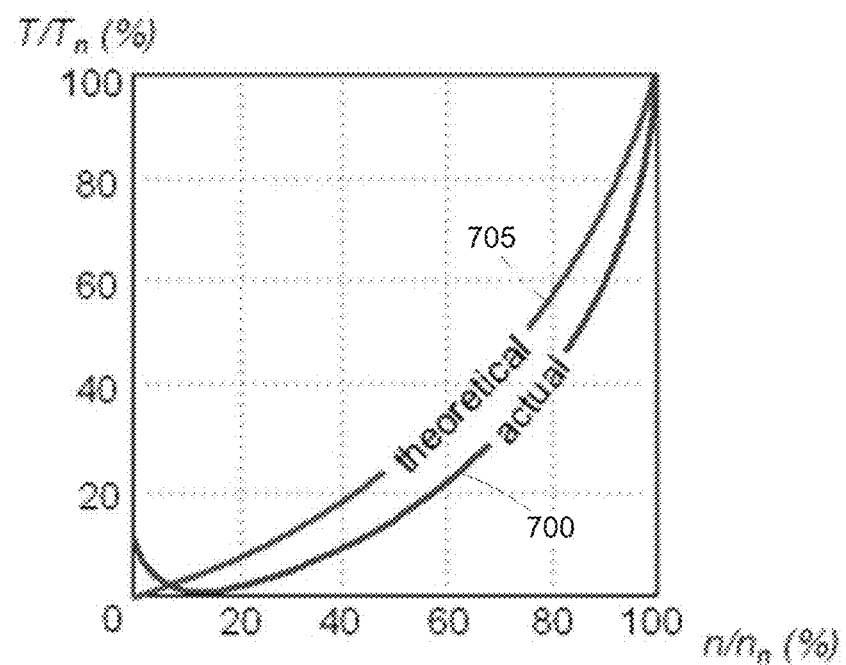
FIG. 16 illustrates a speed-torque operating curve for the pump system.

FIG. 16 illustrates a speed-torque operating curve 700 for the pump system 620. The profile generator 405 in the motor controller 400 provides speed and torque control over the entire operating range that closely matches a theoretical operating curve 705.

Figure 17:
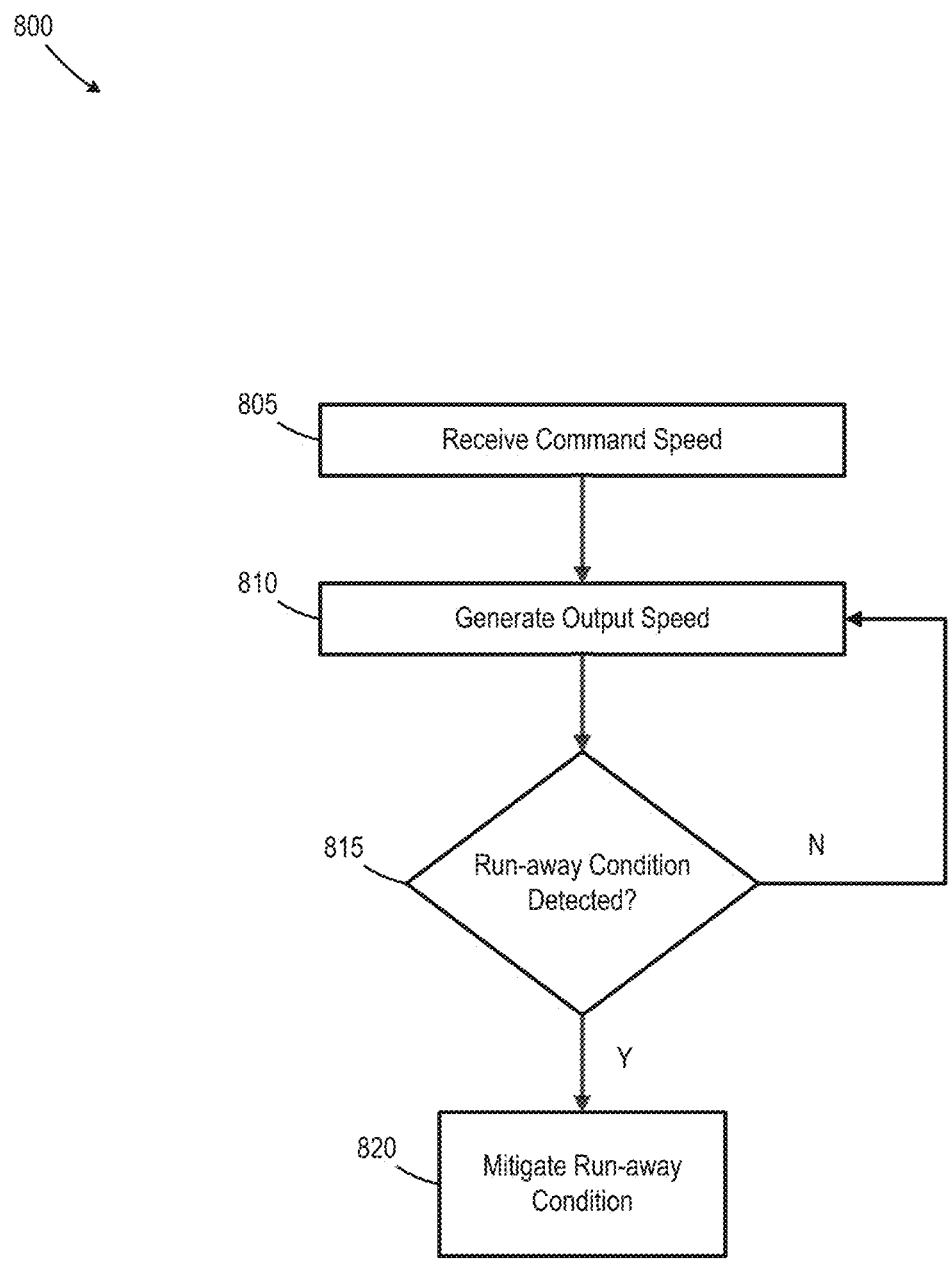
FIG. 17 is a flowchart of a method for run-away detection and control of the motor of the gas engine replacement device of FIG. 1

FIG. 17 is a flowchart 800 of an example method for run-away detection and control of the motor 36, according to some embodiments. The motor controller 400 employs a run-away detection technique to identify and respond to potential run-away conditions. For example, in an embodiment where the gas engine replacement device 10 provides power to move a vehicle, such as a lawnmower, garden tractor, and the like, the vehicle may be operated on a hill such that the speed of the vehicle increases in the absence of a signal to increase the command speed of the motor (e.g., using the user input device 322). The flowchart 800 is described with respect the motor controller 400 of FIG. 12 implemented on the gas engine replacement device 10. However, in some embodiments, the method of the flowchart 800 is implemented by other devices or variations of the motor controller 400.

Referring to FIG. 17, at block 805, the profile generator 405 of the motor controller 400 receives a command speed for the motor 36 (e.g., indicated by the throttle setting or the system setting, as previously described). For example, in some embodiments, the throttle setting and system setting are values that are representative of desired speed for the motor 36. At block 810, the motor controller 400 generates a command speed for the motor 36. For example, in some embodiments, the profile generator 405 generates the command speed based on a profile of the equipment powered by the gas engine replacement device 10, and the brushless controller 420 generates a drive parameter (e.g., PWM duty cycle) for the motor 36 based on the command speed. In some embodiments, the speed controller employs a closed loop control process where shaft speed feedback is employed to adjust the drive parameter employed by the brushless controller 420. In some embodiments, the speed controller employs an open loop control process where the drive parameter generated by the brushless controller 420 is set (e.g., via a fixed PWM duty cycle) in accordance with the throttle setting and system setting received by the profile generator 405.

The motor controller 400 detects a run-away condition at block 815. In some embodiments, the speed controller 410 monitors the shaft speed, such as the shaft of the motor 36 or the power take-off shaft 140, to identify the run-away condition. In one example, when the shaft speed increases by a predetermined value within a predetermined time interval, the speed controller 410 identifies the run-away condition. For example, the motor controller 400 may periodically (e.g., every 100 ms, 10 ms, or 1 ms) detect shaft speed using output from the rotor position sensor 314, and, with the same frequency, detect a change in shaft speed relative to a previous reading (e.g., from 100 ms or 1 second prior). The motor controller 400 may further compare the change in shaft speed to a threshold and, when the detected change in shaft speed exceeds the threshold, identify a run-away condition. Because the motor 36 speed is proportional to a speed of a vehicle powered by the gas engine replacement device 10, an unexpected increase in the shaft speed is indicative of a run-away condition. In some embodiments, the speed controller 410 employs information from the external sensor 340 to identify the run-away condition. For example, the external sensor 340 may be a sensor that measures a ground speed of the vehicle powered by the gas engine replacement device 10. Rather than (or in addition to) determining whether the shaft speed increase by a predetermined value within a predetermined time interval, the motor controller determines whether the vehicle ground speed increases by a predetermined value within the predetermined time interval. This determination may be implemented using a similar technique as with the shaft speed but using instead the sensed vehicle ground speed. In some embodiments, the threshold is set based in part on the desired throttle setting to account for user requesting a speed increase. For example, the threshold may be increased when a user requests an increased vehicle speed as indicated by the throttle setting signal and decreased when a user requests a decreased vehicle speed as indicated by the throttle setting signal. In this way, a typical request for the vehicle to increase speed is less likely to be detected as a run-away condition.

Responsive to the detection of the run-away condition, the motor controller 400 mitigates the run-away condition at block 820. In some embodiments, the motor controller 400 reduces the command speed responsive to the detection of the run-away condition. In some embodiments, the motor controller 400 generates a braking signal responsive to the detection of the run-away condition. In one example, the motor controller 400 turns off the power switching network 310 by controlling all the high-side and low-side FETs to turn off to allow the motor 36 to coast to a stop. Since no current is supplied to the motor when the FETs are turned off, the motor 36 comes to a stop due to the friction or load acting on the motor 36. In other examples, passive or active braking may be used to stop the motor 36. During passive braking, the motor controller 400 may provide control signals to the high-side and low-side FETs to connect the motor to a braking load (e.g., braking coil or braking resistor coupled between one or more stator coils and ground) to quickly dissipate the energy in the motor 36 and to brake the motor 36. During active braking, the motor controller 400 may control the high-side FETs to turn off and the low-side FETs to turn on to short the motor coils to ground and dissipate the remaining energy in the coils to ground. In other examples, the motor controller 400 may provide control signals to the high-side and low-side FETs to perform regenerative braking and provide the energy in the motor 36 back to the battery pack 50 through the power switching network 310. In yet another example, dynamic pulsing may be used to brake the motor 36. The motor controller 400 may provide control signals to the high-side and low-side FETs to provide an electric braking force on the rotor of the motor 36. The motor controller 400 may monitor the rotor position sensor 314 to activate a phase (i.e., a corresponding pair of high-side and low-side FET) when the rotor has just passed the phase. For example, the rotor position sensor 314 indicates that the rotor just rotated past the phase corresponding to FETs H1 and L2. In response, the motor controller 400 may activate the FETs H1 and L2 to drive current through stator coils to generate a magnetic field that provides a braking force to the rotor in a direction opposite the rotation direction of the rotor to stop the rotation. The motor controller 400 may continue to activate FET pairs in a sequence, similar to FIGS. 11A, but with a timing, based on rotor position information from the rotor position sensor 314, such that the resulting magnetic field generated by the coupled stator coils continues to provide a braking force to stop the rotation. In some embodiments, the motor controller 400 sends a signal to an electronically controlled mechanical brake of the vehicle powered by the replacement device 10.

Figure 18:
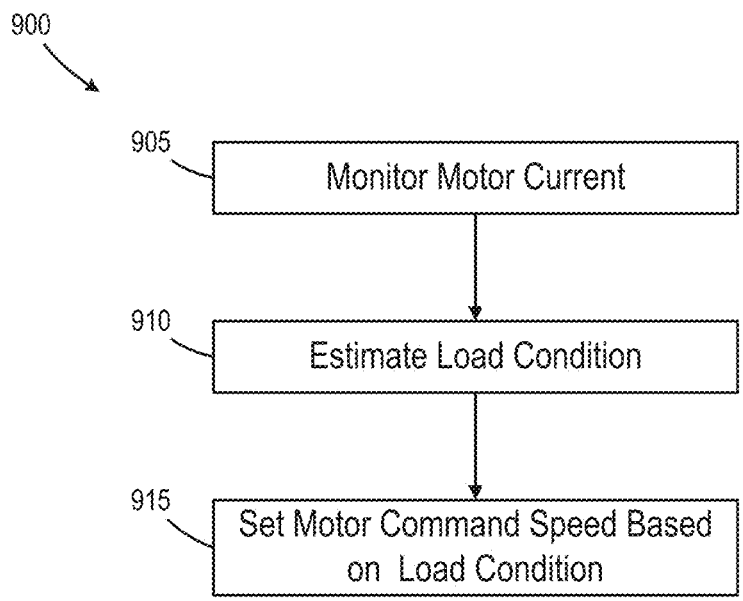
FIG. 18 is a flowchart of a method for load monitoring using the gas engine replacement device of FIG. 1.
Figure 19:
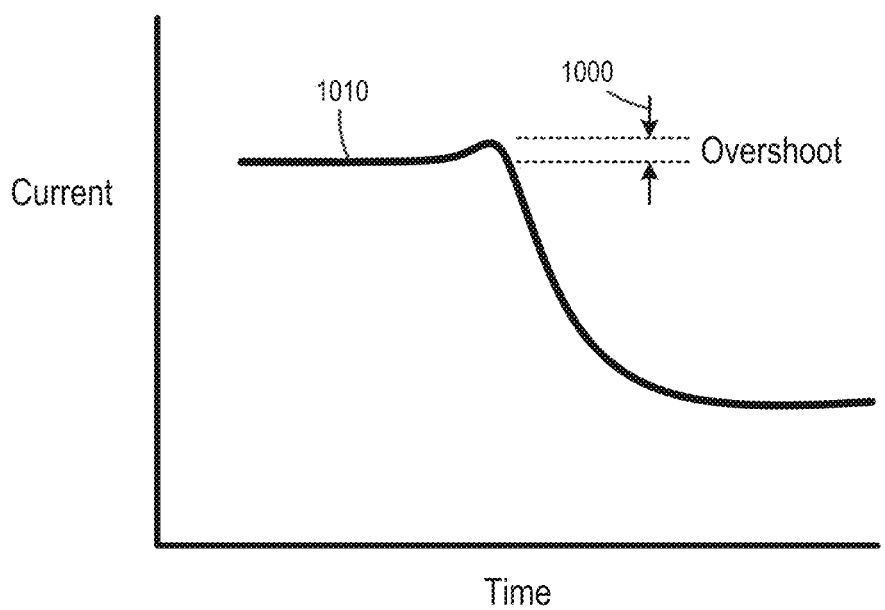
FIGS. 19 and 20 are diagrams illustrating perturbations in a motor current useful for identifying load conditions, according to some embodiments.
Figure 20:
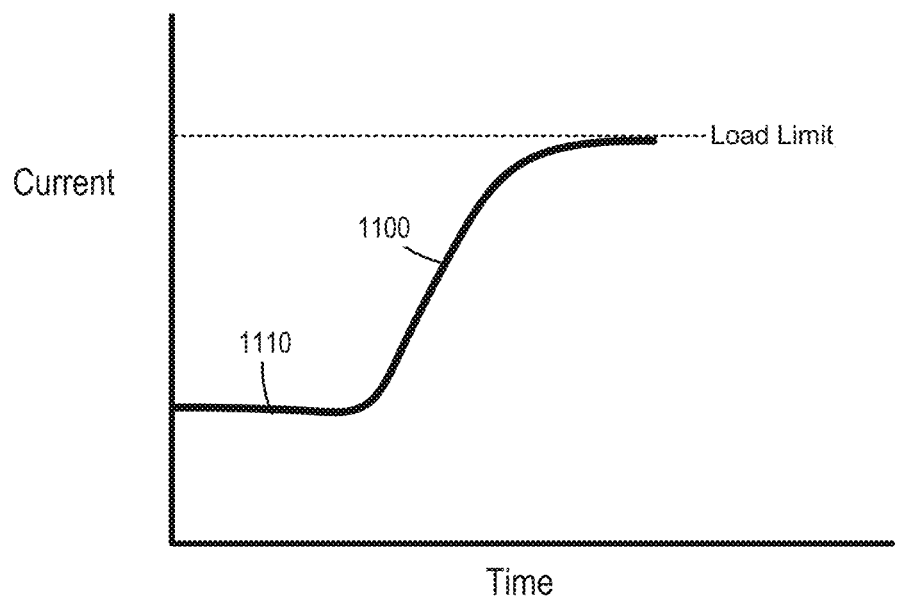

Referring to FIGS. 18, 19, and 20, the motor controller 400 employs a load monitoring technique to estimate a condition of the load and adjust the load speed as a function of the load parameter. FIG. 18 is a flowchart 900 of an example method for load monitoring, according to some embodiments. FIGS. 19 and 20 are diagrams 450 illustrating perturbations in a motor current useful for identifying load conditions, according to some embodiments. For example, in an embodiment where the gas engine replacement device 10 provides power to a cement mixer, the viscosity of the load is variable based on the contents of the mixer and the rotational speed. Increasing the rotational speed of the mixer generally reduces viscosity, while reducing the rotational speed of the mixer generally increases viscosity. In another embodiment where the gas engine replacement device 10 provides power to a cutting blade, such as on a lawnmower or saw, the density of the material being cut is variable (e.g., based on grass length and thickness or material composition). Increasing the rotational speed of the cutting blade is useful for thick grass or dense material, while reducing the rotational speed of the cutting blade is useful for less dense grass or material, which reduces power consumption. The flowchart 900 is described with respect the motor controller 400 of FIG. 12 implemented on the gas engine replacement device 10. However, in some embodiments, the method of the flowchart 900 is implemented by other devices or variations of the motor controller 400.

Referring to FIG. 18, the motor controller 400 monitors a current parameter of the motor 36 at block 905. In some embodiments, the motor controller 400 identifies an overshoot condition in the motor current. For example, in a cement mixer embodiment, when the mixer is first rotated, the material adheres to the wall of the mixer. At a certain rotational position that depends on the viscosity of the material, the material falls to the bottom of the mixer, resulting in an abrupt reduction in the load on the mixer. As shown in FIG. 19, this load reduction is evidenced by an overshoot 1000 in a motor current curve 1010. As shown in FIG. 20, in a cutting blade embodiment, an increase in the density of the material being cut is evidenced by a ramp 1100 in a motor current curve 1110.

The motor controller 400 estimates a load condition at block 910. For example, the motor controller estimates a load viscosity or density parameter as the load condition. In a mixing embodiment, the rotational position and the magnitude of the overshoot 1000 are functions of the material viscosity. In some embodiments, the motor controller 400 uses the rotor position sensor 314 to determine a rotational position. In some embodiments, the external sensor 340 is a position sensor that provides a rotational position of the mixer. In a cutting example, the magnitude and slope of the ramp 1100 are functions of the material density. In some embodiments, the profile generator 405 stores a profile of the equipment powered by the gas engine replacement device 10 that relates the load condition to the sensed motor parameters. In some embodiments, the profile includes a look-up table, an equation model, or a deep learning model.

The motor controller 400 sets a motor command speed based on the load condition at block 915. In some embodiments, the motor controller 400 (e.g., the profile generator 405) is programmed with a viscosity target value and adjusts the command speed of the motor 36 responsive to the estimated viscosity load condition to drive or maintain the estimated viscosity load condition near the viscosity target value. In some embodiments, for a cutting application, the motor controller 400 changes the command speed proportionally with respect to changes in the estimated density. In some embodiments, the motor controller 400 increases the command speed of the cutting blade as density increases and decreases the command speed as density decreases. In some embodiments, the motor controller 400 stores a model or look-up table specifying an adjustment factor for the command speed as a function of the estimated load condition.

Figure 21:
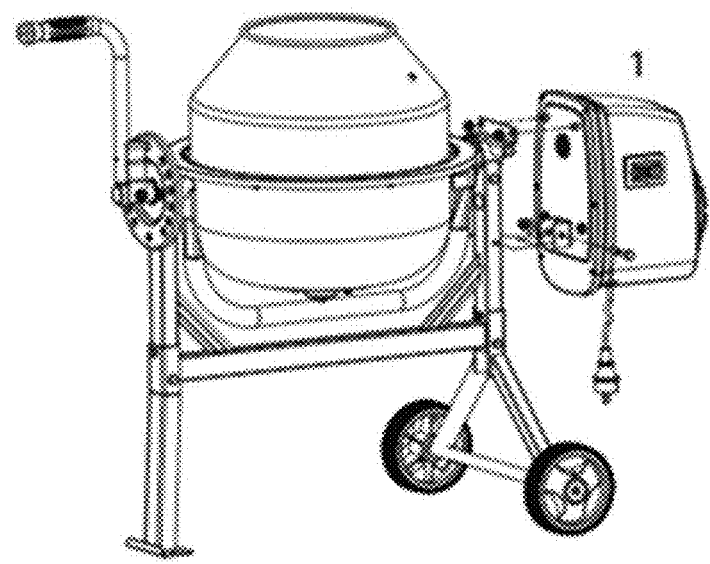
FIG. 21 illustrates a mixing system including the gas engine replacement device of FIG. 1.

FIG. 21 illustrates a mixing system 1200 including a frame 1205 supporting the gas engine replacement device 10 and a mixing drum 1210, with the gas engine replacement device 10 operable to rotate the mixing drum 1210. In some embodiments, the gas engine replacement device 10 of the mixing system 1200 implements the motor control described above with respect to FIGS. 18 and 19.

Figure 22:
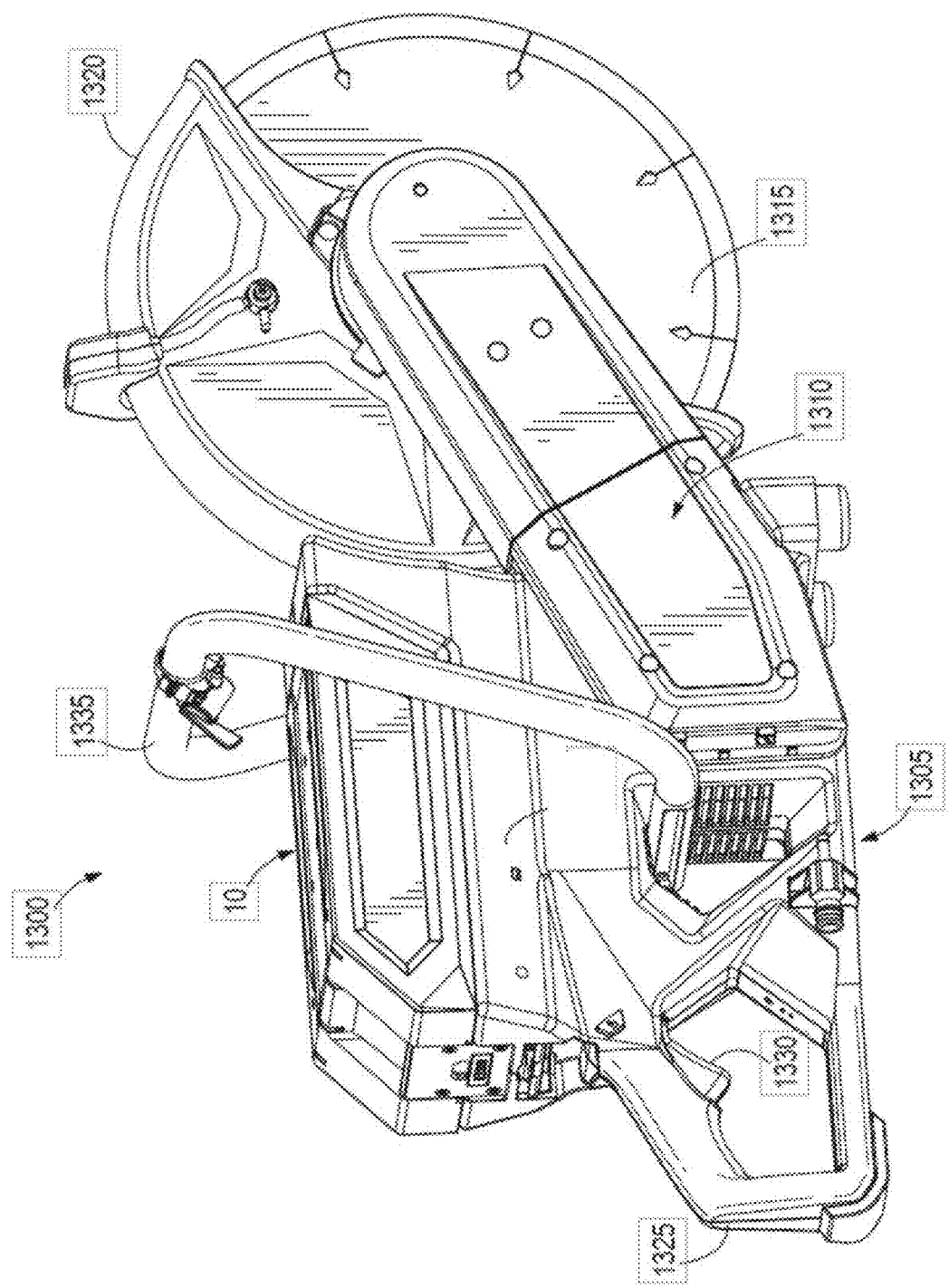
FIG. 22 illustrates a cutting system including the gas engine replacement device of FIG. 1.

FIG. 22 illustrates a cutting system 1300, which is a cut-off saw in the illustrated embodiment. The cutting system 1300 includes a housing 1305, a support arm 1310 coupled to and extending from the housing 1305, a cutting wheel 1315 carried by the support arm 1310, and a guard 1320 covering a portion of the circumference of the cutting wheel 1315. The cutting wheel 1315 can be a blade, an abrasive disk, or any other rotatable element capable of removing material from a workpiece. A first or rear handle 1325 extends from a rear portion of the housing 1305 in a direction generally opposite the support arm 1310. A trigger 1330 for operating the cutting system 1300 is located on the rear handle 1325. In the illustrated embodiment, the cutting system 1300 also includes a second or forward handle 1335 that wraps around an upper portion of the housing 1305. The forward handle 1335 and the rear handle 1325 provide grip areas to facilitate two-handed operation of the cutting system 1300. The illustrated cutting system 1300 is a cordless electric saw and includes the gas engine replacement device 10. In some embodiments, the gas engine replacement device 10 of the cutting system 1300 implements the motor control described above with respect to FIGS. 18 and 20.

Figure 23:
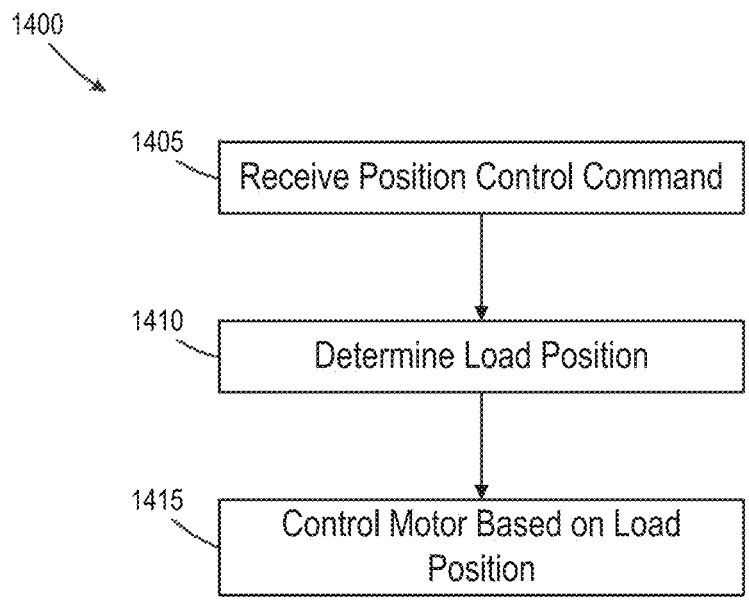
FIG. 23 is a flowchart of an example method for load positioning using the gas engine replacement device of FIG. 1.

FIG. 23 is a flowchart 1400 of an example method for load positioning, according to some embodiments. For example, in an embodiment where the gas engine replacement device 10 provides power to a cement mixer, material may be loaded into the mixing drum when the mixing drum is positioned at a first rotational position and unloaded from the mixing drum when the mixing drum is positioned at a second rotational position.

Referring to FIG. 23, the motor controller receives a position control command at block 1405. In some embodiments, a user inputs a position control command using the external device 338 (see FIG. 9). For example, the user may select a load position or an unload position by selecting a control displayed on the external device 338 or a user input device 322 (e.g., a push button). In some embodiments, the external device 338 is a wired or wireless remote-control device associated with the equipment driven by the gas engine replacement device 10. The position control command indicates to the motor controller 400 to rotate the load to a particular position (e.g., a particular rotational position of the mixing drum of the cement mixer 1200).

At block 1410, the motor controller 400 determines a load position. In some embodiments, the motor controller 400 uses the rotor position sensor 314 to determine a position of the load. In some embodiments, the external sensor 340 is a position sensor that provides a position of the load (e.g., a rotational position for the mixing drum).

At block 1415, the motor controller 400 controls the motor 36 based on the load position. In some embodiments, the profile stored by the profile generator 405 includes position data, such as a load position for loading or unloading positions, or for other positions associated with the equipment. Responsive to the position control command received at block 1405 and the load position determined at block 1410, the motor controller 400 stops the motor 36 responsive to the load position corresponding to the position control command. For example, the motor controller 400 may control the motor 36 to rotate until the particular rotational position of the mixing drum is reached, at which point the motor 36 is stopped. Before the desired position of the load is reached, the motor 36 may decelerate to reduce position overshoot.

In some embodiments, the load position corresponding to the position control command is set by a manufacturer setting up the gas engine replacement device 10 or by a user of the device. For example, the external device 338 or user input device 322 may be employed to specify a load position corresponding to the position control command. For example, in response to a user input via the external device 338 or the user input device 322, the current load position may be stored as the load position target corresponding to the position control command. In some embodiments, multiple position control commands may be provided corresponding to multiple load position targets (e.g., a load position and an unload position), and each may be associated with a different desired load position of the load, which may be set in the motor controller 400 using similar techniques (e.g., via manufacturer set up or via a user using external device 338 or user input device 322). For example, the user input device 322 may include a set load position button and a set unload position button that provide an input to the motor controller 400 to store the current load position as the desired load position and desired unload position, respectively. The stored desired load position and desired unload position may then be used by the motor controller 400 in block 1415, where one of the two stored positions is selected depending on whether a position control command requested the load to be rotated to the load position or unload position.

A power tool can potentially be subjected to ingress, vibration, and thermal elements, and the power tool's electronics may be sensitive to these elements. Various techniques may be used to protect one or more electronic components of the gas engine replacement device 10 from extreme environments. In one example, thermal extremes can damage electronics. In some embodiments, a protection technique for an extreme thermal environment to increase tool performance includes using a thermally conductive potting. Another technique includes placing one or more electronic components in a pressurized mineral oil bag with cooling to provide thermal relief and allows for increased performance. These techniques can also provide protection for environmental hazards, such as ingress of water or other substances. Also, open contacts may be covered with glue or a low-pressure injection mold for electrically charged or sensitive components to extend the tool life in extreme conditions. In some applications, these techniques are also effective in mitigating risk from vibration and assisting in strain relief for components soldered to a circuit board.

Figure 24:
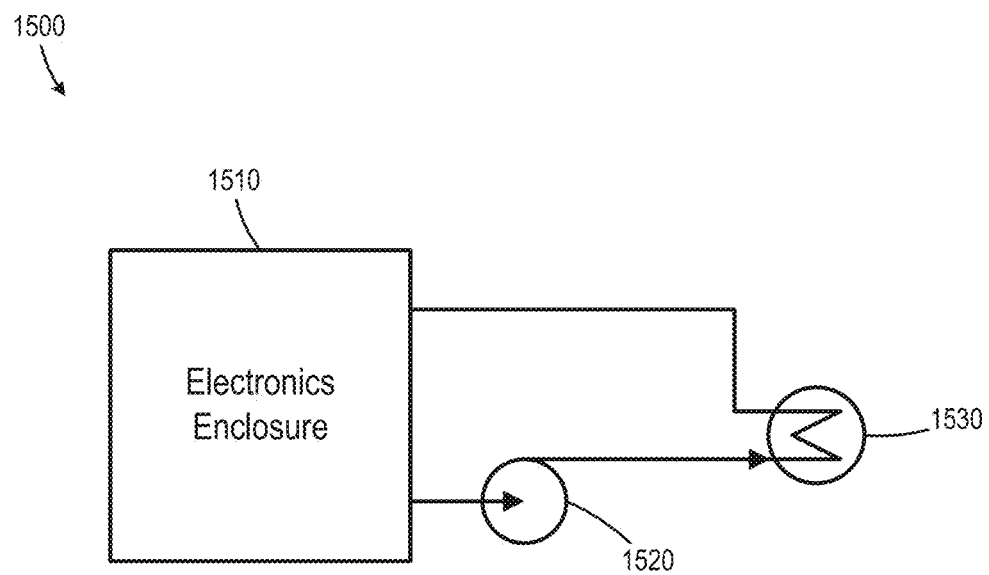
FIG. 24 illustrates a cooling system for one or more electronic components in the gas engine replacement device of FIG. 1.

FIG. 24 illustrates a cooling system 1500 for one or more electronic components in the gas engine replacement device of FIG. 1. The cooling system 1500 includes an electronics enclosure 1510, a pump 1520, and a heat exchanger 1530. Sensitive components of the gas engine replacement device 10, such as the electronic processor 302 and memory 306 in FIG. 9, may be provided in the electronics enclosure 1510. The pump 1520 circulates an inert fluid, such as mineral oil, through the electronics enclosure 1510 to remove heat. The heat exchanger 130 cools the inert fluid to remove the heat from the cooling system 1500. In some embodiments, the heat exchanger may be a radiation type exchanger, such as a fin-based heat sink, that radiates heat to the external environment. Air in the ambient environment may circulate over the fins to remove the heat. The electronics enclosure 1510 also serves to provide protection from ingress, vibration, strain, or the like.

The mechanical systems described above driven by the gas engine replacement device 10 includes many advantages over conventional equipment driven by an internal combustion engine, some of which are discussed below.

In some embodiments, the gas engine replacement device 10 can be mated with a new equipment and the memory 306 can be reprogrammed to optimize the gas engine replacement device 10 for operation with the new equipment. In some embodiments, the electronic processor 302 automatically recognizes which type of new equipment the gas engine replacement device 10 has been mated with and governs operation of the gas engine replacement device 10 accordingly. In some embodiments, the electronic processor 302 can automatically detect with which equipment the gas engine replacement device 10 has been mated via Radio Frequency Identification (RFID) communication with the new equipment.

In some embodiments, the memory 306 is reprogrammable via either BLUETOOTH or Wi-Fi communication protocols. In some embodiments, the electronic processor 302 has control modes for different uses of the same equipment. The control modes may be preset or user-programmable and may be programmed remotely via BLUETOOTH or Wi-Fi. In some embodiments, the electronic processor 302 utilizes master/slave equipment-to-equipment communication and coordination, such that the gas engine replacement device 10 can exert unidirectional control over equipment, or an operator can use a smartphone application to exert unidirectional control over the gas engine replacement device 10.

In some embodiments, the operator or original equipment manufacturer (OEM) is allowed limited access to control the speed of the gas engine replacement device 10 through the electronic processor 302 via, e.g., a controller area network (CAN)-like interface. In some embodiments, the electronic processor 302 is capable of a wider range of speed selection with a single gear set in the gear train 110 than a gasoline engine. For example, the control electronics 42 are configured to drive the motor 36 at less than 2,000 RPM, which is lower than any speed a gasoline engine is capable of, which permits the associated equipment to have a greater overall runtime over a full discharge of the battery pack 50, than a gasoline engine. Additionally, the control electronics 42 are configured to drive the motor at more than 3,600 RPM, which is higher than any speed a gasoline engine is capable of, and with the capability to deliver more torque. The wider range of speeds of motor 36 offers greater efficiency and capability than a gasoline engine. In some embodiments, the operator could have access to control the current drawn by the motor 36 in addition to the speed.

In some embodiments, the electronic processor 302 is configured to log and report data. For example, the electronic processor 302 is configured to provide wired or wireless diagnostics for monitoring and reading the status of the gas engine replacement device 10. For example, the electronic processor 302 can monitor and log gas engine replacement device 10 runtime for example, in a rental scenario. In some embodiments, the motor 36 and the electronic processor 302 use regenerative braking to charge the battery pack 50. In some embodiments, the gas engine replacement device 10 includes a DC output for lights or accessories. In some embodiments, the electronic processor 302 can detect anomalies or malfunctions of the gas engine replacement device 10 via voltage, current, motion, speed, and/or thermocouples. In some embodiments, the electronic processor 302 can detect unintended use of or stoppage of the gas engine replacement device 10. If the equipment driven by the gas engine replacement device 10 is not running with the intended characteristics or is not being used correctly or safely, the electronic processor 302 can detect the anomaly and deactivate the gas engine replacement device 10. For example, the gas engine replacement device 10 can include one or more accelerometers to sense if the gas engine replacement device 10 and equipment is in the intended orientation. And, if the electronic processor 302 determines that the gas engine replacement device 10 is not in the intended orientation (i.e. the equipment has fallen over), the electronic processor 302 can deactivate the gas engine replacement device 10.

In some embodiments, the gas engine replacement device 10 includes accessible sensor ports (not shown) to electrically connect with user-selected sensors for use with the piece of power equipment, such as accelerometers, gyroscopes, GPS units, or real time clocks, allowing an operator to customize the variables to be sensed and detected by the electronic processor 302. In some embodiments, the electronic processor 302 can indicate the status of the battery pack 50, such as when the battery is running low, to an operator via visual, audio, or tactile notifications. In some embodiments, the electronic processor 302 can operate an auxiliary motor that is separate from the motor 36 to drive an auxiliary device such as a winch. The auxiliary motor may be internal or external to the gas engine replacement device 10.

In some embodiments, the gas engine replacement device 10 can include digital controls on a customizable user interface, such as a touch display or a combination of knobs and buttons. In contrast, an analog gasoline engine does not include such digital controls. In some embodiments, the user interface for the gas engine replacement device 10 can be modular, wired, or wireless and can be attachable to the gas engine replacement device 10 or be handheld. In some embodiments, the gas engine replacement device 10 can be controlled with a remote control that includes status indicators for certain characteristics of the gas engine replacement device 10, such as charge of the battery pack 50 and the temperature. In some embodiments, the gas engine replacement device 10 can provide status indications with a remote, programmable device.

We claim:

1. A gas engine replacement device comprising:
   a housing;
   a battery receptacle coupled to the housing and configured to removably receive a battery pack;
   a motor located within the housing;
   a power take-off shaft receiving torque from the motor and protruding from a side of the housing;
   a power switching network configured to selectively provide power from the battery pack to the motor; and
   an electronic processor coupled to the power switching network and configured to control the power switching network to rotate the motor, the electronic processor configured to:
   receive a command speed for the motor,
   determine whether the command speed is in a first exclusion zone,
   determine whether the command speed is in a second exclusion zone,
   set an output speed for the motor at the command speed responsive to the command speed being outside the first exclusion zone and the second exclusion zone,
   set the output speed to a speed outside the first exclusion zone responsive to the command speed being in the first exclusion zone,
   set the output speed to a speed outside the second exclusion zone responsive to the command speed being in the second exclusion zone, and
   control the power switching network to rotate the motor in accordance with the output speed set based on whether the command speed was determined to be in the first exclusion zone or the second exclusion zone.

2. The gas engine replacement device of claim 1, wherein:
   the electronic processor is configured to set the output speed to an upper limit of the first exclusion zone responsive to a previous output speed being greater than the first exclusion zone.

3. The gas engine replacement device of claim 1, wherein the electronic processor is configured to set the output speed to a lower limit of the first exclusion zone responsive to a previous output speed being less than the first exclusion zone.

4. The gas engine replacement device of claim 1, wherein the first exclusion zone defines a hysteresis around a resonant frequency of a mechanical system coupled to the motor.

5. The gas engine replacement device of claim 4, further comprising a vibration sensor, wherein the electronic processor is configured to identify the resonant frequency based on an output of the vibration sensor.

6. The gas engine replacement device of claim 1, comprising a vibration sensor, wherein the electronic processor is configured to generate the first exclusion zone based on an output of the vibration sensor.

7. The gas engine replacement device of claim 1, comprising:
a pump coupled to the power take-off shaft.

8. The gas engine replacement device of claim 1, comprising:
an enclosure surrounding the electronic processor and including an inert fluid;
a pump configured to circulate the inert fluid in the enclosure; and
a heat exchanger coupled to the enclosure.

9. A method for operating a gas engine replacement device including a housing, a battery receptacle coupled to the housing and configured to removably receive a battery pack, a motor located within the housing, a power take-off shaft receiving torque from the motor and protruding from a side of the housing, a power switching network configured to selectively provide power from the battery pack to the motor, and an electronic processor coupled to the power switching network and configured to control the power switching network to rotate the motor, the method comprising:
receiving, by the electronic processor, a command speed for the motor;
determining, by the electronic processor, whether the command speed is in a first exclusion zone;
determining, by the electronic processor, whether the command speed is in a second exclusion zone;
setting, by the electronic processor, an output speed for the motor at the command speed responsive to the command speed being outside the first exclusion zone and the second exclusion zone;
setting, by the electronic processor, the output speed to a speed outside the first exclusion zone responsive to the command speed being in the first exclusion zone;
setting, by the electronic processor, the output speed to a speed outside the second exclusion zone responsive to the command speed being in the second exclusion zone; and
controlling, by the electronic processor, the power switching network to rotate the motor in accordance with the output speed set based on whether the command speed was determined to be in the first exclusion zone or the second exclusion zone.

10. The method of claim 9, further comprising:
setting, by the electronic processor, the output speed to an upper limit of the first exclusion zone responsive to a previous output speed being greater than the first exclusion zone.

11. The method of claim 10, further comprising:
setting, by the electronic processor, the output speed to a lower limit of the first exclusion zone responsive to a previous output speed being less than the first exclusion zone.

12. The method of claim 9, wherein the exclusion zone defines a hysteresis around a resonant frequency of a mechanical system coupled to the motor.

13. The method of claim 12, further comprising:
identifying, by the electronic processor, the resonant frequency based on an output of the vibration sensor.

14. The method of claim 9, wherein the gas engine replacement device includes a vibration sensor, further comprising:
generating, by the electronic processor, the first exclusion zone based on an output of the vibration sensor.

* * * * *